United States Patent [19]

Cohen-Sabban

[11] Patent Number: 4,988,200
[45] Date of Patent: Jan. 29, 1991

[54] APPARATUS FOR AUTOMATIC TRACKING AND CONTOUR MEASUREMENT

[75] Inventor: Yael L. Cohen-Sabban, Yahud, Israel

[73] Assignee: Israel Aircraft Industries, Ltd., Lod, Israel

[21] Appl. No.: 192,269

[22] Filed: May 10, 1988

[30] Foreign Application Priority Data

May 18, 1987 [IL] Israel .......................................... 82569

[51] Int. Cl.$^5$ ............................................ G01B 11/24
[52] U.S. Cl. ...................................... 356/376; 250/202; 318/577; 364/474.30; 382/60
[58] Field of Search .................. 356/376; 250/202; 318/577; 364/474.29, 474.3; 382/8, 60

[56] References Cited

U.S. PATENT DOCUMENTS

| 3,671,937 | 6/1972 | Takahashi et al. | 250/202 |
| 4,160,199 | 7/1979 | Bardwell | 318/577 |
| 4,396,832 | 8/1983 | Henderson | 364/474.30 |
| 4,578,574 | 3/1986 | Grant et al. | 250/202 |

FOREIGN PATENT DOCUMENTS 0218515 12/1984 Japan ................................ 318/577

Primary Examiner—Samuel Turner
Attorney, Agent, or Firm—Cushman, Darby & Cushman

[57] ABSTRACT

Apparatus for automatic tracking and contour measurement comprising electro-optical sensing apparatus mounted on a CNC machining head for providing an output indication of contours of an object in the precise frame of reference of the CNC machining head.

14 Claims, 33 Drawing Sheets

EQUIVALENT DETECTOR PLANE

- INITIAL VELOCITY NOT PARALLEL TO EDGE.
- ADJUST DIRECTION OF VELOCITY (MOTION).
- SLOW DOWN.

- MOTION PARALLEL TO EDGE. EDGE NOT CENTERED ON SENSOR.
- ADJUST Y POSITION.
- GO ON AT HIGH SPEED.

- MOTION PARALLEL TO EDGE. EDGE CENTERED.
- GO ON AT MAX. SPEED.

◯ = MEASUREMENT POINT.
o = LEADING POINT.

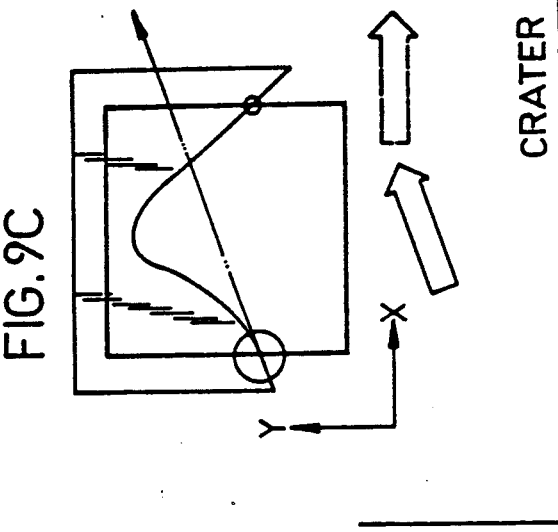
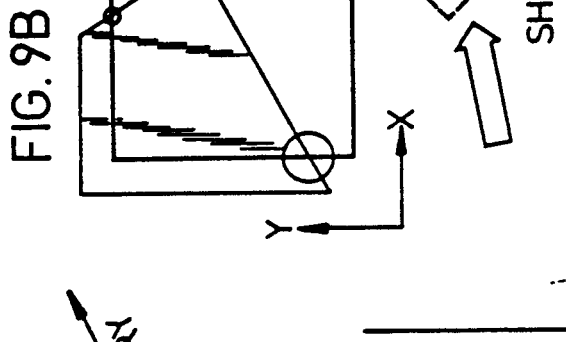
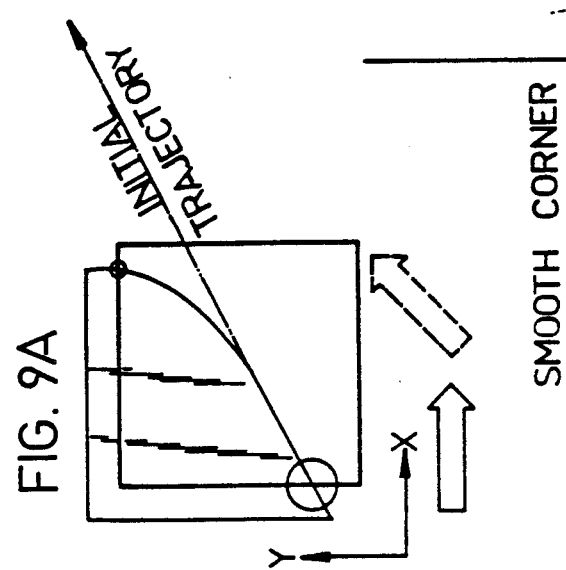

| CASE: | "NARROW END" | "BAY" | "FINGER" |
|---|---|---|---|
| SIGNS: | 3 UNIFORM (BLACK) ARRAYS. | ABRUPT JUMP FROM UPPER BRANCH TO LOWER BRANCH. | 3 NON-UNIFROM ARRAYS. |

◯ = MEASUREMENT POINT.

o = LEADING POINT.

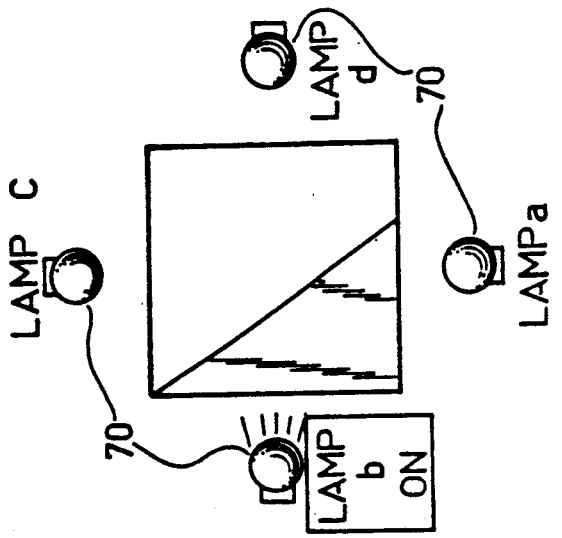
FIG. 11A    FIG. 11B    FIG. 11C
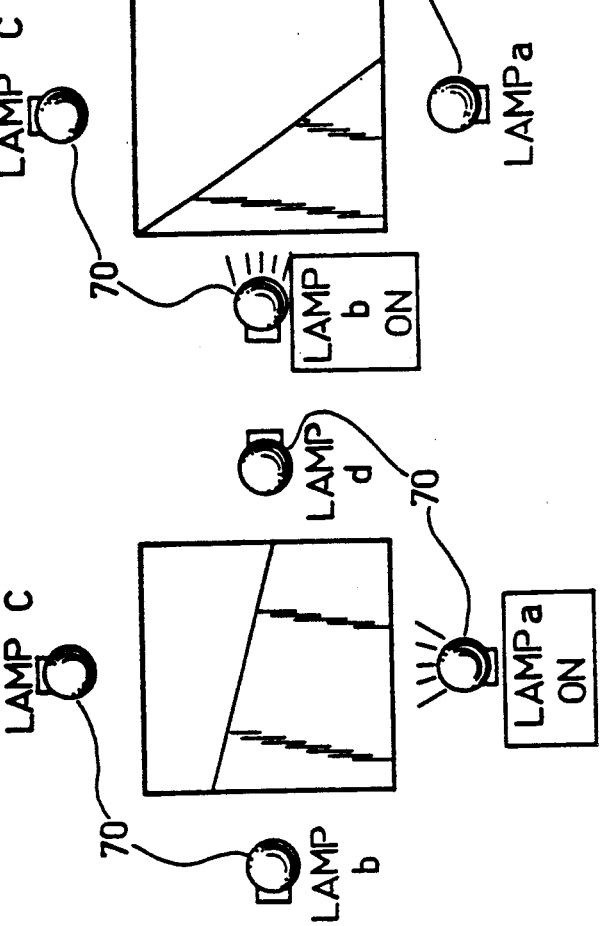
- 4 SOURCES: AUTOMATIC ILLUMINATION OF ONE SOURCE AT A TIME
- SOURCE WAVELENGTH MATCHED TO SENSOR TO IMPROVE SNR

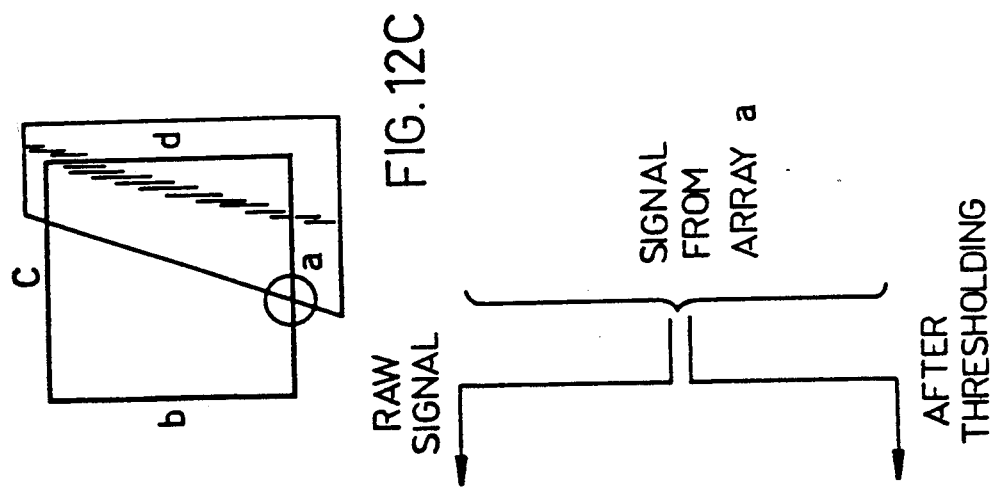
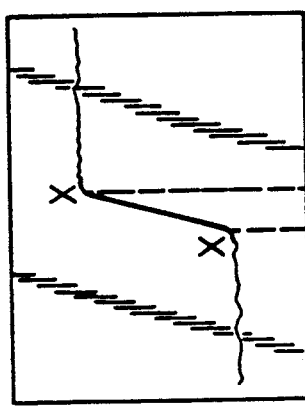 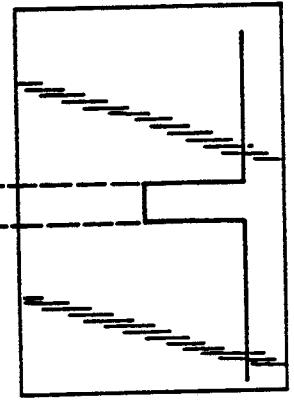
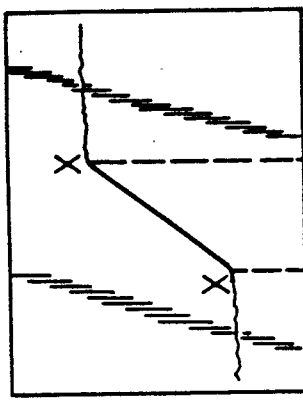 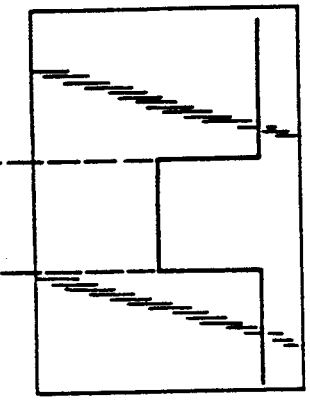

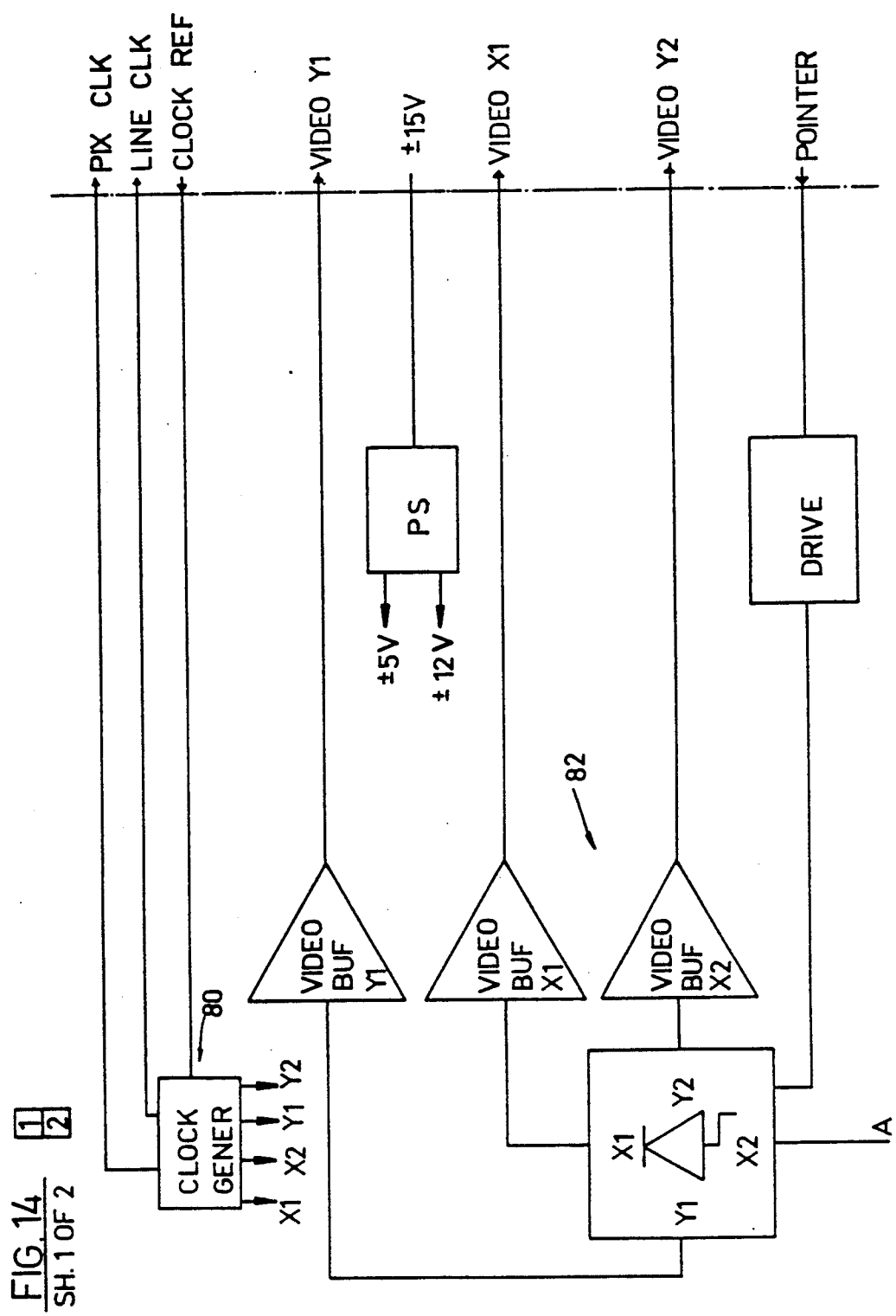

SH. 2 OF 2

SH. 1 OF 2

SH 2 OF 2

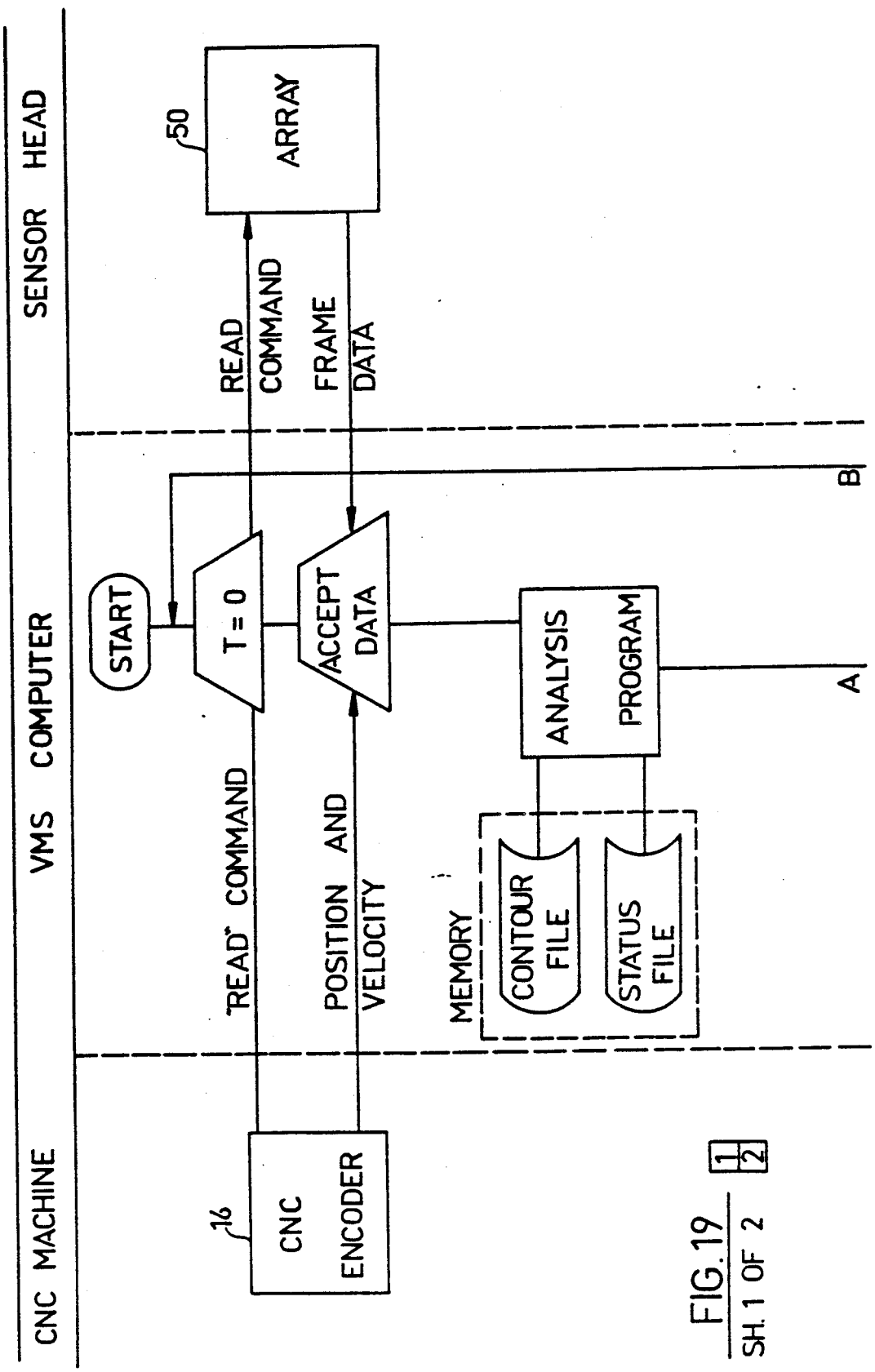
FIG. 19 SH. 1 OF 2

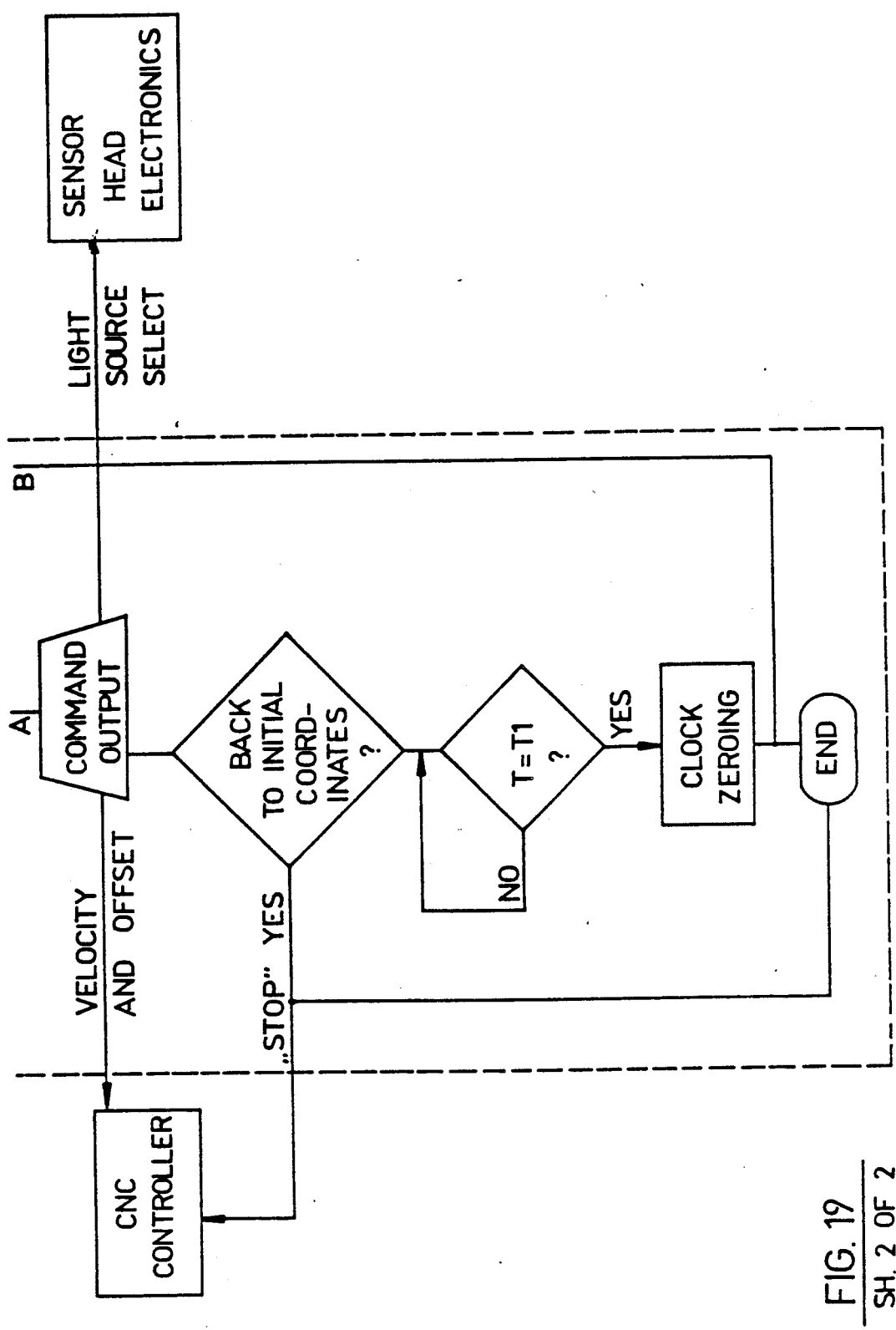
FIG. 19 SH. 2 OF 2

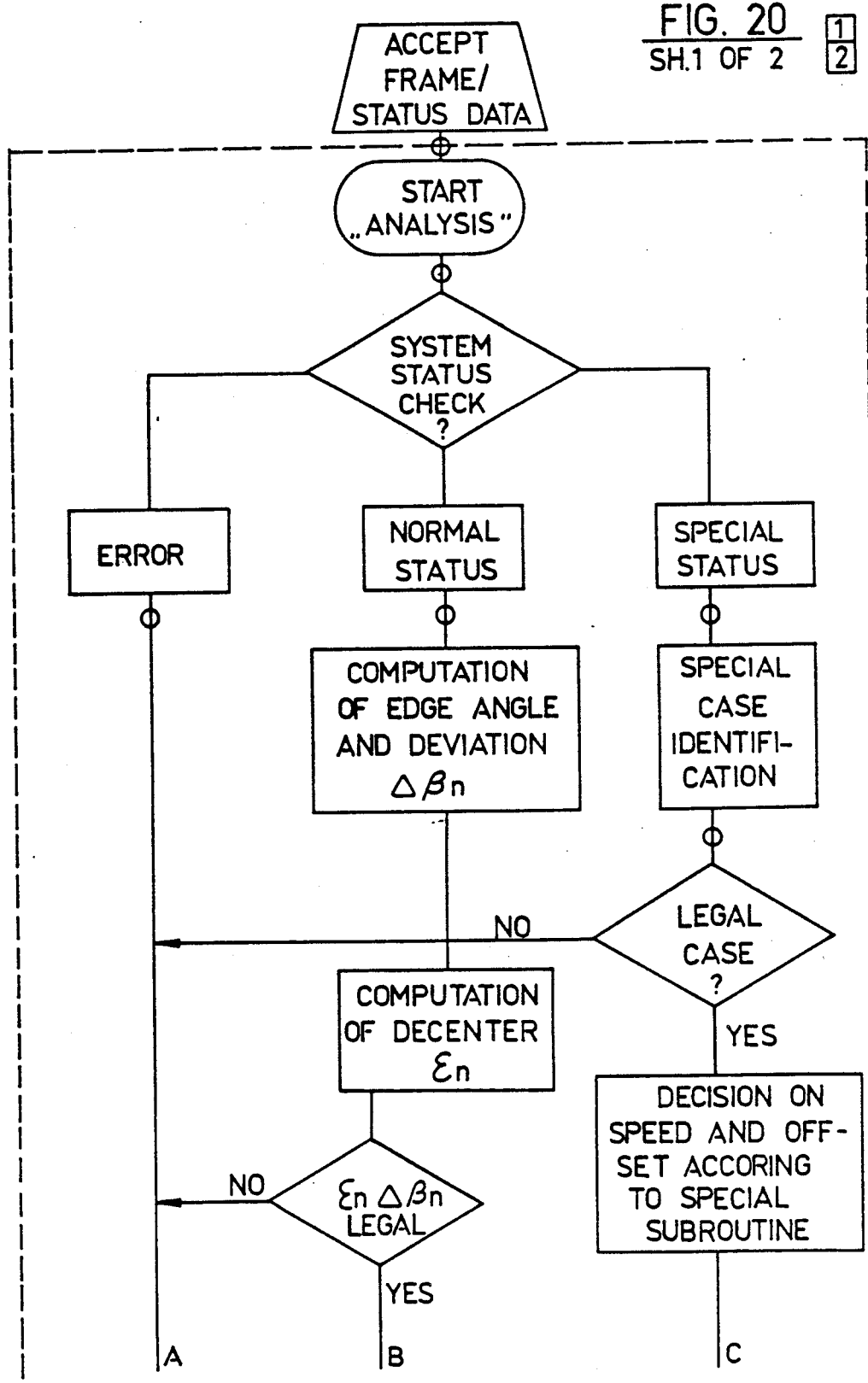
FIG. 20 SH.1 OF 2

SH. 2 OF 2

SH.1 OF 2

SH. 2 OF 2

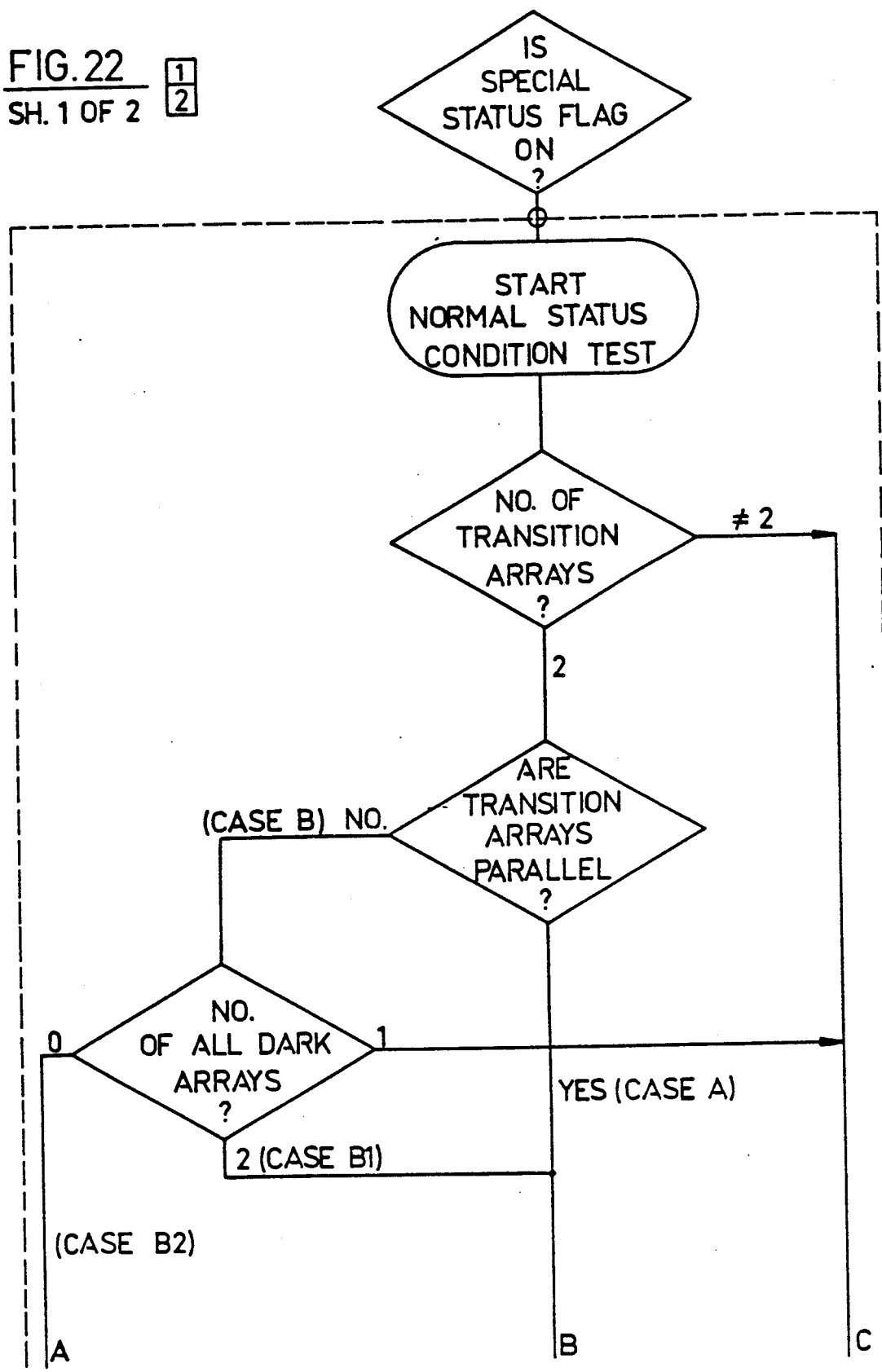

SH. 2 OF 2

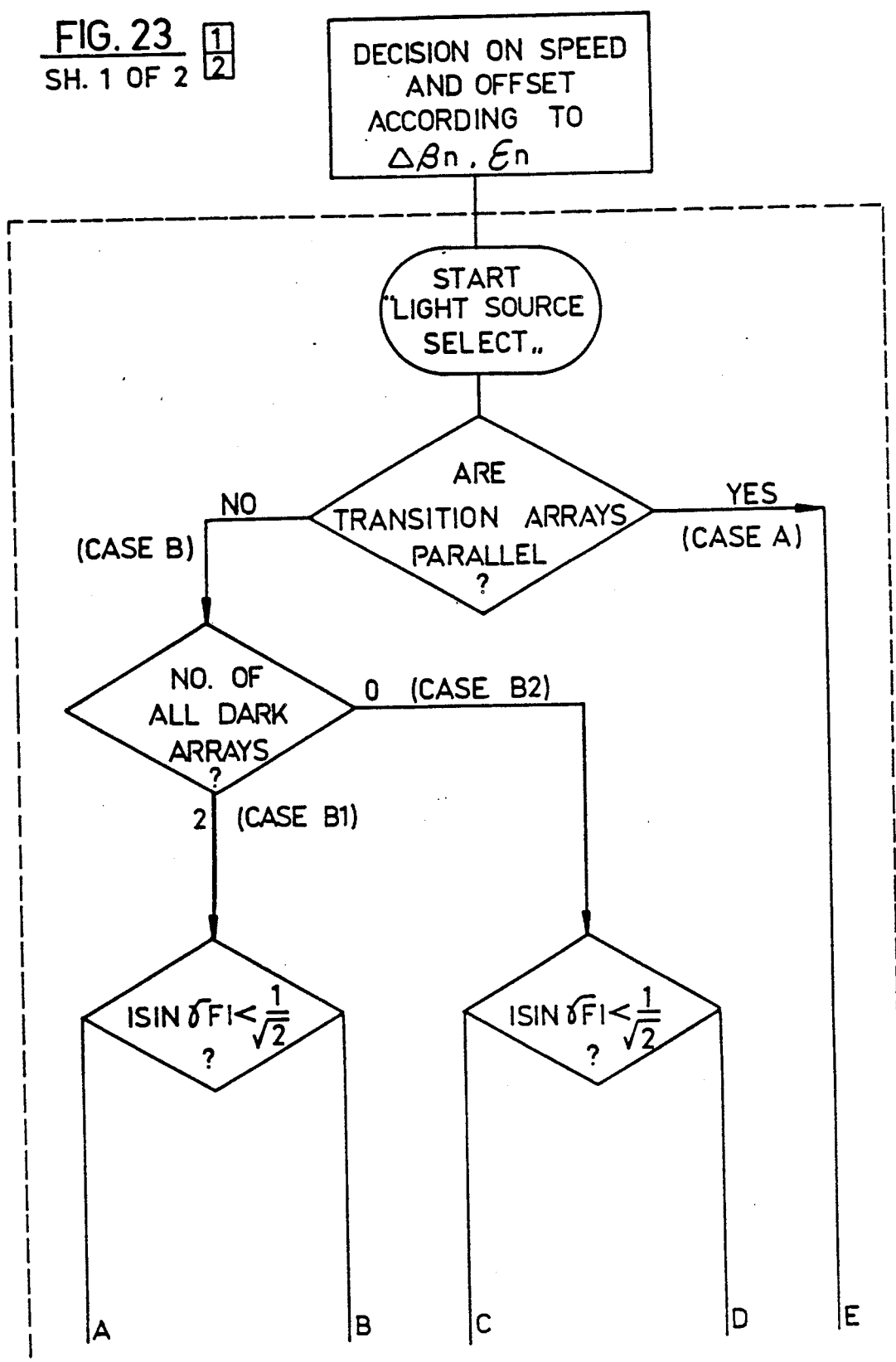

SH. 2 OF 2

CASE A     CASE B1     CASE B2

| | |
|---|---|
| LIGHT SOURCE SELECTED | — ☼ |
| FOLLOWING ARRAY | — F |
| LEADING ARRAY | — L |
| ANGLE BETWEEN EDGE AND FOLLOWING ARRAY | — $\delta F$ |
| MEASUREMENT POINT | — O |
| DIRECTION OF MOTION | — ⇨ |

CASE A1

1 TRANSITION ARRAY

3 ALL DARK ARRAYS

CASE A2

1 TRANSITION ARRAY

3 ALL LIT ARRAYS

CASE B1

2 PARALLEL TRANSITION ARRAYS

2 ALL DARK ARRAYS

CASE B2

2 PARALLEL TRANSITION ARRAYS

2 ALL LIT ARRAYS

CASE C1

2 NEIGHBOURING TRANSITION ARRAYS

2 DARK ARRAYS
LIT PORTION NEIGHBOURING ALL DARK ARRAYS

CASE C2

2 NEIGHBOURING TRANSITION ARRAYS.

2 ALL LIT ARRAYS
DARK PORTION NEIGHBOURING ALL LIT ARRAYS

CASE D1

3 TRANSITION - ARRAYS.
1 ALL-DARK ARRAY
  NO LIT PORTION
  NEIGHBOURING
  ALL DARK ARRAY

CASE D2

3 TRANSITION ARRAYS.
1 ALL DARK ARRAY
1 LIT PORTION NEIGHBOURING.
  ALL DARK ARRAY

CASE E1

4 TRANSITION ARRAYS
  LIT PORTIONS AND
  DARK PORTIONS IN
  NEIGHBOURING ARRAY
  ARE WELL ARRANGED.

APPARATUS FOR AUTOMATIC TRACKING AND CONTOUR MEASUREMENT

FIELD OF THE INVENTION

The present invention relates to automated measurement and machining apparatus generally and more particularly to electro-optical measurement apparatus and machining control apparatus useful in association with machine tools.

BACKGROUND OF THE INVENTION

In recent years there have been significant advances in the art of automatic machining. Large, versatile CNC machine tools have become the standard. Such machine tools are conventionally programmed by computer in response to program instructions supplied by design engineers. Such programming is extremely time consuming and expensive.

There has long existed a need for machine tools which can be programmed by a teach in technique to produce a CNC file, which can then be amended or modified as desired. Such machines are not believed to presently exist.

While there do exist gauges for electro-optically measuring a given object and outputting coordinates thereof to a computer for subsequent use in programming machine tools, no such device has been integrated with the machine tool itself.

SUMMARY OF THE INVENTION

The present invention seeks to provide measurement and tracking apparatus for mounting on a CNC machining head, which enables the configuration of a given object to be directly inputted to a CNC controller in the frame of reference and coordinate system of the CNC machining head.

There is thus provided in accordance with a preferred embodiment of the present invention apparatus for automatic tracking and contour measurement comprising electro-optical sensing apparatus mounted on a CNC machining head for providing an output indication of contours of an object in the precise frame of reference of the CNC machining head.

Additionally in accordance with a preferred embodiment of the present invention, the electro-optical sensing apparatus comprises first and second pairs of spaced linear detector arrays, the first and second pairs extending mutually perpendicularly.

Further in accordance with a preferred embodiment of the present invention, the electro-optical sensing apparatus comprises a beam splitter, which provides a first portion of incoming light to the first pair of spaced linear detectors lying in a first plane and provides a second portion of incoming light to the second pair of spaced linear detectors lying in a second plane, perpendicular to the first plane.

Additionally in accordance with a preferred embodiment of the present invention, the first and second pairs of linear detectors and the beam splitter define an equivalent detector array in the form of a planar array defining the periphery of a rectangle, square or circle.

Further in accordance with a preferred embodiment of the present invention the apparatus for tracking and contour measurement also comprises apparatus for sensing a direction of movement of the sensing apparatus with respect to the object being measured, apparatus for designating the leading array with respect to the direction of motion for providing direction information and apparatus for designating the following array with respect to the direction of motion for providing measurement information.

Additionally in accordance with a preferred embodiment of the invention, selectable workpiece illumination means are provided for providing illumination of the workpiece from a direction selected in accordance with the relationship of the contour to the leading array.

Further in accordance with a preferred embodiment of the present invention the apparatus for tracking and contour measurement also comprises a non-contact distance sensor and is operative for measuring contours in three dimensions.

Additionally in accordance with a preferred embodiment of the invention there is provided apparatus for proving a CNC program prior to machining comprising apparatus for generating a three-dimensional description of a machined workpiece on the basis of a CNC program therefor, apparatus for generating a synthetic drawing of the machined workpiece from the three-dimensional description and apparatus for comparing the synthetic drawing with a corresponding CAD file for the machined workpiece to provide an output indication of discrepancies therebetween.

Further in accordance with the foregoing embodiment, apparatus may be provided for comparing the CNC program, the three-dimensional description or the synthetic drawing with stored acceptable machining parameters and providing an output indication of discrepancies between elements of the CNC program and the acceptable machining parameters.

BRIEF DESCRIPTION OF THE DRAWINGS

The present invention will be understood and appreciated more fully from the following detailed description taken in conjunction with the drawings in which:

FIGS. 9A, 9B and 9C illustrate the operation of the apparatus of the present invention for corners and turning motion;

FIGS. 11A, 11B and 11C illustrate the operation of illumination apparatus of the present invention for three typical cases;

FIGS. 12A, 12B and 12C illustrate the operation of automatic focusing apparatus of the present invention;

FIGS. 19-23 each with parts 1 and 2 are each flow charts illustrating operating algorithms useful in the present invention;

DETAILED DESCRIPTION OF THE INVENTION

Figure 1:
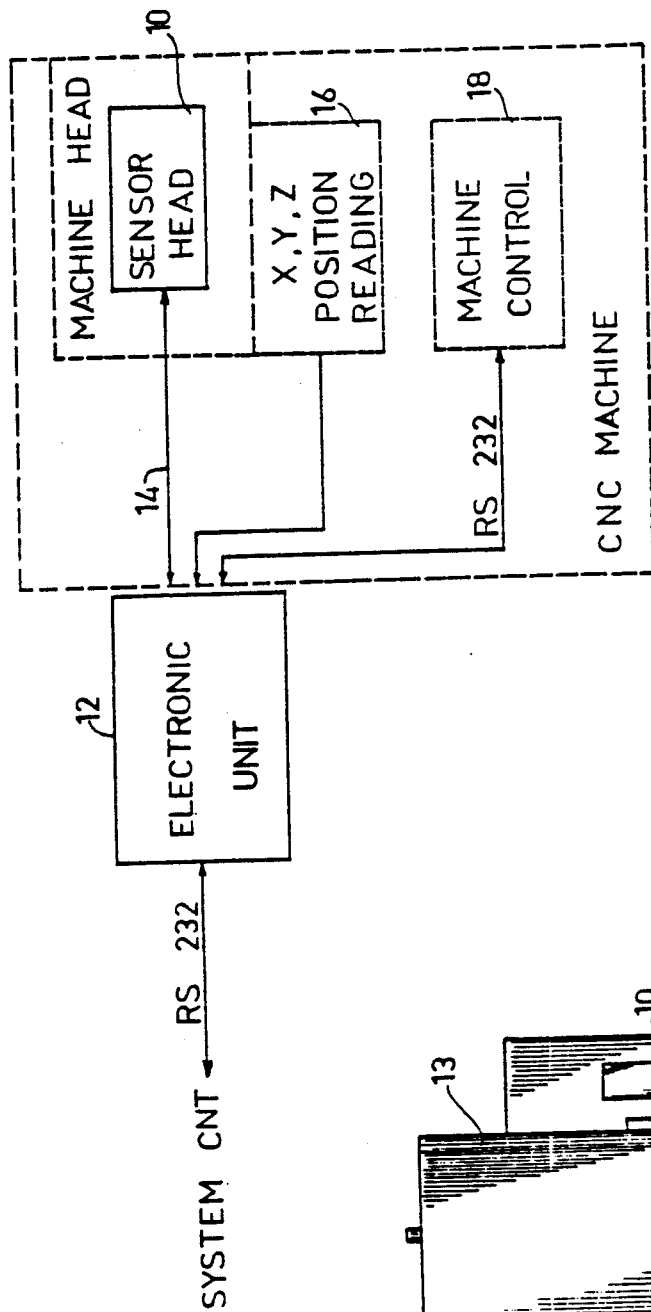
FIG. 1 is a generalized block diagram illustration of the system of the present invention.

Reference is now made to FIG. 1 which illustrates measurement and tracking apparatus for mounting on a CNC machining head constructed and operative in accordance with a preferred embodiment of the invention. A sensor head 10, which is illustrated in FIG. 3 and will be described hereinafter in detail, is mounted on a machine head of a CNC machine tool, such as a IMA NORTE CNC milling machine manufactured in West Germany, adapted to have a real-time capability, in a manner illustrated generally in FIG. 2. An electronic unit 12 is mounted elsewhere on the CNC machine tool or in proximity thereto and communicates with the sensor head 10 via suitable flexible conductors 14. Electronic unit 12 also receives position inputs from an X, Y, Z position encoder 16 mounted onto the machine head, and communicates with a machine control 18, both of which form an integral part of CNC machine tools. The electronic unit also communicates, as via an RS 232 port, with a system controller (not shown).

The machining tool and its controller should be of a type capable of supporting real-time communication with the electronic unit, such as a MILLMASTER B-5V, manufactured by Shizuoka, Japan, equipped with a FANUC SYSTEM 11M MODEL A, using the TAPE MODE for input, the G37 COMMAND for interruption and measurement of position, and the POSITION DISPLAY OPTION for retrieving position data.

Figure 2:
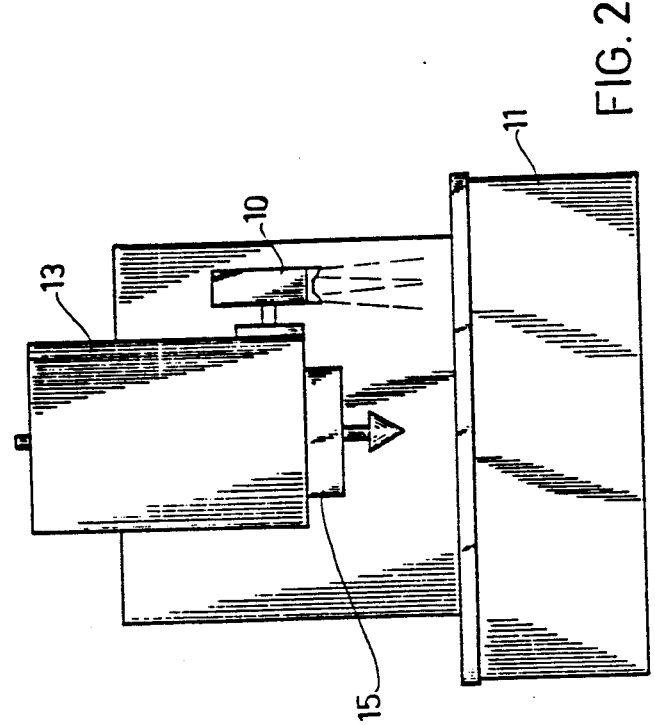
FIG. 2 is a pictorial illustration of the physical arrangement of the optical head of the present invention on a machining head of a CNC machine.
Figure 3:
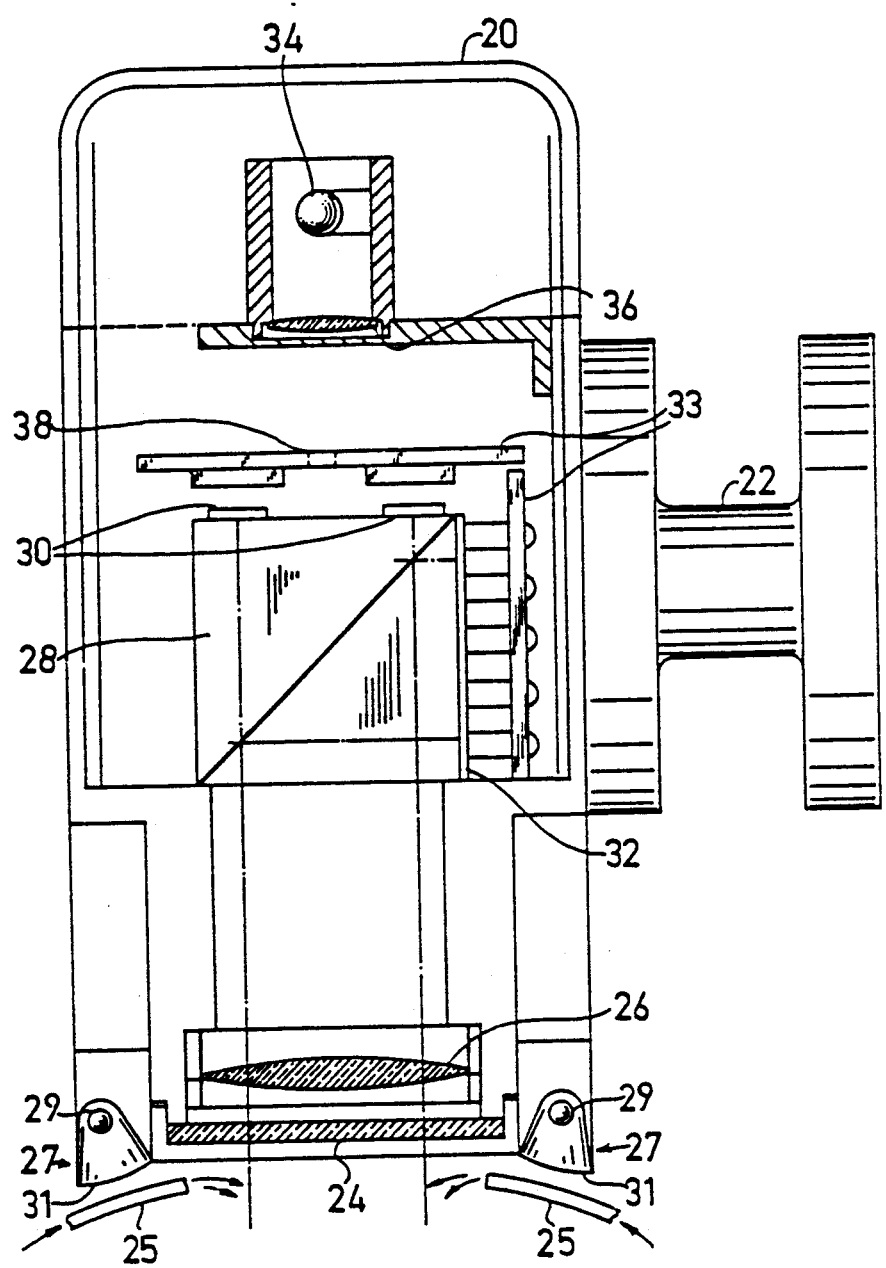
FIG. 3 is a sectional illustration of the optical head mentioned in FIG. 2.

Referring now to FIG. 2 there is seen in generalized side view illustration a machine tool comprising a base 11 and a machine head 13 which moves relative to the base 11 and includes a spindle 15. Fixedly mounted onto the machine head 13 is the sensor head 10. According to an alternative embodiment of the invention, the optical head may be mounted onto the spindle.

Figure 6:
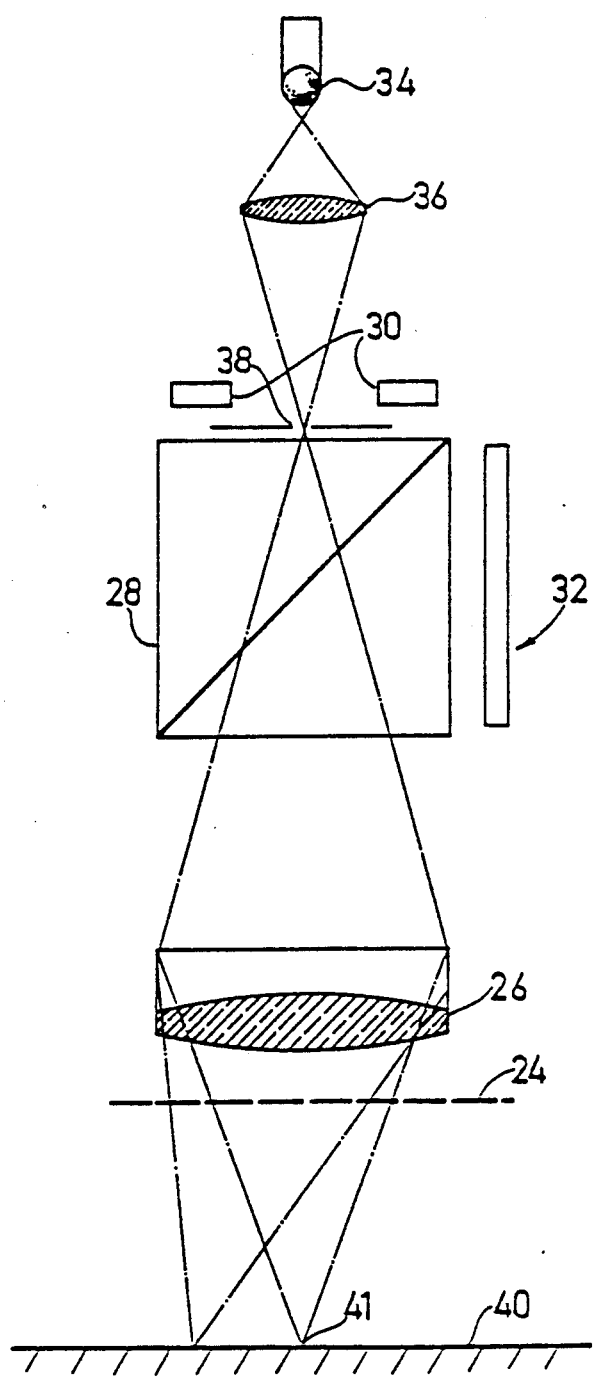
FIG. 6 is an optical illustration of the optical head of FIG. 3.

Referring now to FIGS. 3 and 6, there is seen an optical head constructed and operative in accordance with an embodiment of the present invention and comprising a housing 20 having an associated mounting member 22, arranged for mounting of the optical head on the machine head of a CNC machine as illustrated in FIG. 2. Disposed within housing 20 is an optical filter window 24, arranged to permit light communication with a workpiece (not shown) within a predefined wavelength range, typically outside the visible spectrum in the near IR range so as to filter out illumination from ambient and spurious light sources. One or more air jets 25 are arranged for keeping the filter window 24 clean in a conventional CNC environment.

Four illumination sources 27 are disposed on the respective four sides of filter window 24 and are selectably operated to provide oblique lighting of a workpiece thereby to provide high resolution definition of the edges thereof. Each illumination source 27 typically comprises an LED 29 embedded in a glass or plastic light guide 31, such as one formed of Perspex (R) which is configured to provide illumination of the entire region seen through window 24. Preferably the wavelength of the LED 29 is matched to the sensitivity of the sensor arrays 30 and 32 and to the transparent wavelength of the filter 24.

Disposed behind window 24 is a focusing lens 26 which is disposed in an operative optical arrangement with a beam splitter 28, along the two conjugate surfaces of which are disposed respective first and second pairs 30 and 32 of linear sensor arrays, such as CCD linear arrays. Electronic circuitry associated with the sensor arrays is located on circuit boards 33. Additional electronic circuitry (not shown) is located within housing 20.

According to a preferred embodiment of the invention, a light source 34, such as a LED, is focused by a lens 36 on a pinhole 38 located at the center of one of the surfaces of the beam splitter 28, between the first pair 30 of linear arrays. The pinhole is imaged by lens 26 on an object being measured in an object plane 40 for providing a small visible spot 41 to aid in set up of the apparatus.

Figure 4:
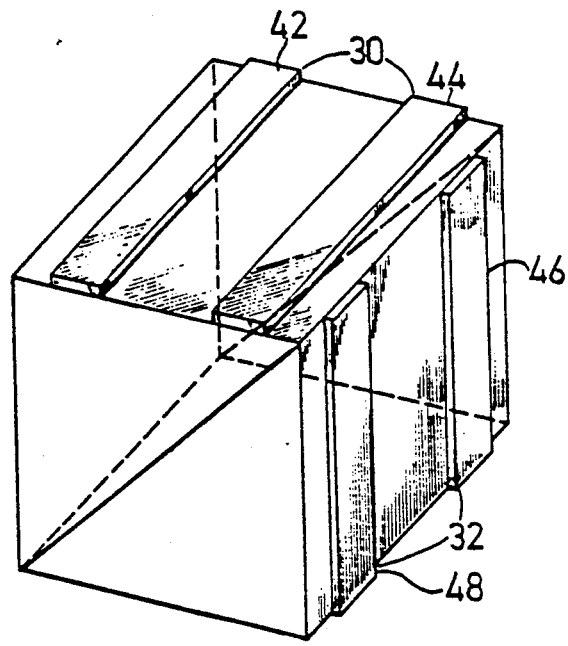
FIG. 4 is a pictorial illustration of the arrangement of the beam splitter and detectors in the optical head of FIG. 3.
Figure 5:
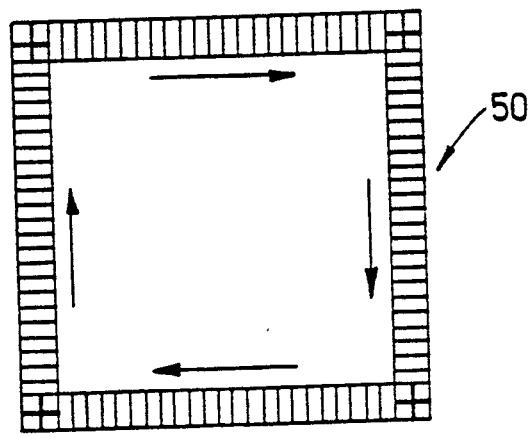
FIG. 5 is an illustration of the equilvalent planar detector array corresponding to the arrangement of FIG. 4.

Reference is now made to FIGS. 4 and 5, which illustrate the preferred configuration of sensors employed in accordance with the present invention. FIG. 4 illustrates the physical arrangement of the sensor arrays on the beam splitter 28. It is seen that the first pair 30 comprises spaced, generally parallel disposed sensors 42 and 44, while the second pair 32 comprises spaced generally parallel disposed sensors 46 and 48, which extend perpendicularly to sensors 42 and 44.

FIG. 5 shows the equivalent sensor array 50 in a plane parallel to the object plane 40 and corresponding to the sensor array of FIG. 4. As seen in FIG. 5, the sensor array describes the perimeter or periphery of a rectangle, in the present embodiment, specifically a square. A principal advantage of this configuration resides in the possibility of maintaining its orientation fixed relative to the reference axes of the machine head. Alternatively, the sensor array may describe a perimeter of any other suitable shape, such as the perimeter or periphery of a circle. Any conventional circular CCD detector may be employed for this purpose, such as EG&G Reticon RO 0720 B.

Figure 7:
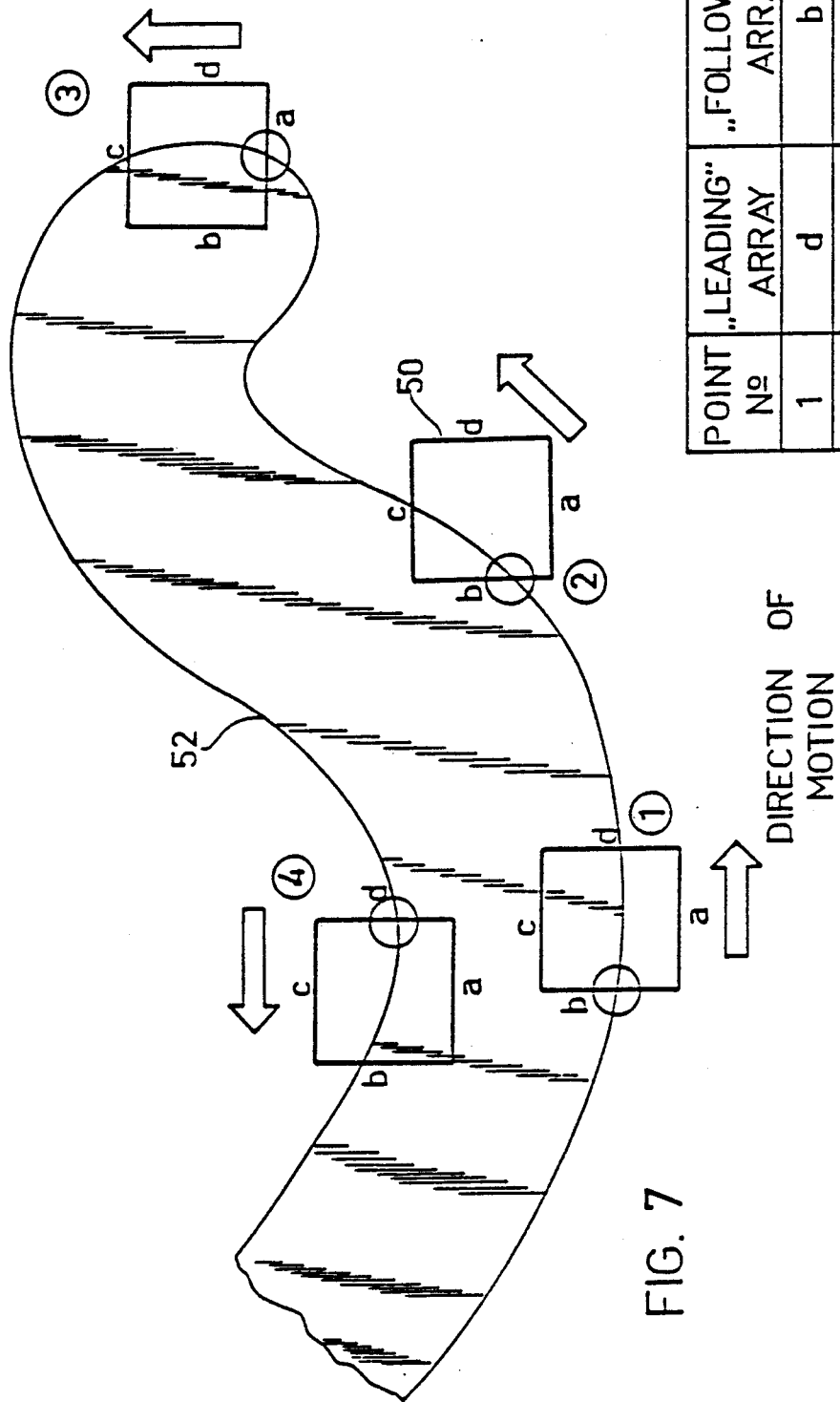
FIG. 7 is an illustration of the general operation of the apparatus of the present invention.

Referring now to FIG. 7, it can be seen that the rectangular sensor array 50 of FIG. 5 can track the array of a given contour 52 without rotating, thereby maintaining the inherent accuracy of positioning of the CNC machine head. It is noted that normally the image of the edge of a contour crosses at least two linear portions of the array 50. It may be appreciated that different linear portions of the array 50 define the leading edge thereof depending on the direction of motion and the configuration of the contour 52 at a given location thereon.

In accordance with a preferred embodiment of the invention, a see-ahead capability is provided by the leading edge at any given time. It provides information as to the general direction of the contour so as to enable the CNC controller to select the X and Y velocities of the machine head accordingly to provide smooth and efficient motion.

The following edge, in accordance with a preferred embodiment of the present invention, provides measurement information by indicating the pixel location of the contour. The system combines this information with the known fixed relationship between each pixel location on the array 50 to the center of the machining head and the known position of the machining head at any given time to provide position coordinates for the contour at any given time.

It is a particular feature of the invention that the sensor array 50 enables much faster processing than would a full matrix array, which would provide a large amount of data requiring processing, in excess of that required for the tracking function.

The tracking operation of the apparatus of the present invention will now be described with reference to FIGS. 8A-10C. Generally speaking, the present invention employs two types of input data: frame data, which is obtained from the four linear portions of the array 50 and status data originating from the CNC position sensor 16.

The frame data indicates which of the four linear sensor arrays of array 50 has a black/white crossing, i.e. engages a contour, and the location of the black/white crossing along each linear array. Due to the oblique illumination of the workpiece object provided in accordance with a preferred embodiment of the invention, a white pixel is a pixel which receives light reflected from the workpiece, while a black pixel is a pixel which does not receive reflected light from the workpiece. An array having a black/white crossing is termed a "transition array". The apparatus of the illustrated embodiment of the present invention is capable of detecting only a single black/white crossing in any given transition array. Thus each transition array is considered to consist of one white portion and one dark portion.

It may be appreciated that for each of the four linear arrays, only two data items are retained, the pixel number of the first white pixel in the linear array and the pixel number of the first black pixel in the linear array. If there are no white pixels in a linear array, the pixel number is indicated as zero, similarly for black pixels.

The status data indicates the coordinates of the center of the machining head and also indicates the velocity along the x and y axes of the sensor head.

The apparatus of the present invention is operative to carry out the following logic tasks:

orientation—defining the general location of the contour relative to the machine head;
coordinates—determining the specific coordinates of black/white transitions relative to the machine head;
general direction—determining the general direction of the next movement of the machine head;
logic control—verification of consistency of input data.

Figure 8A:
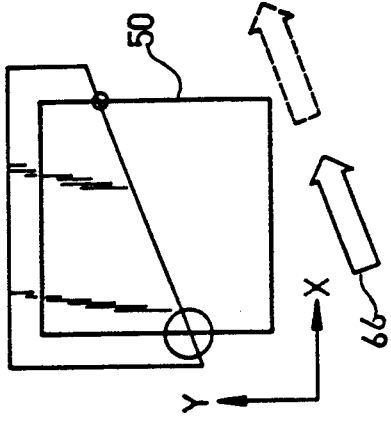
FIGS. 8A, 8B and 8C illustrate the operation of the apparatus of the present invention for linear or nearly linear motion.
Figure 8B:
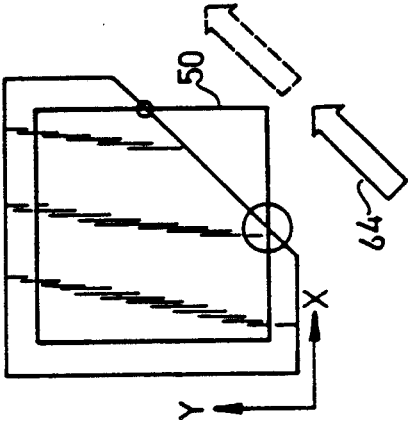
Figure 8C:
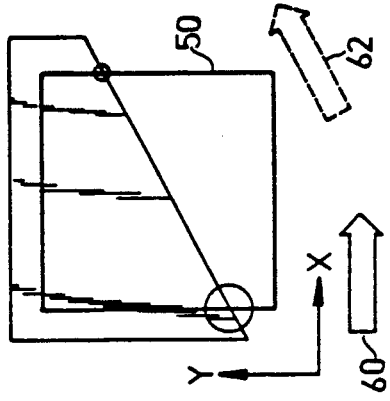

Reference is made now to FIGS. 8A-8C which illustrate the operation of the invention for linear or nearly linear motion in determining speed and direction of motion. The following two criteria govern the operation:

1. maintenance of the velocity of the head parallel to the contour;
2. maintenance of array 50 centered on the contour.

FIG. 8A illustrates a situation wherein the velocity, as indicated by an arrow 60, is not parallel to the contour. In such a case, the velocity is adjusted to be as indicated by an arrow 62, i.e. parallel to the contour, and the speed is decreased.

FIG. 8B illustrates a situation wherein the velocity, as indicated by an arrow 64, is generally parallel to the contour but the array 50 is not centered thereon. In such a case, the y-axis position of the contour is adjusted to lower the array 50 and full speed is maintained in the same direction.

FIG. 8C illustrates a situation wherein the velocity, as indicated by an arrow 66, is generally parallel to the contour and the array 50 is generally centered thereon. In such a case no corrections are made and full speed is maintained in the same direction.

FIGS. 9A-9C illustrate the treatment of corner configurations. FIG. 9A illustrates a generally smooth corner, FIG. 9B illustrates a sharp corner and FIG. 9C illustrates a "crater". In each of these situations, the speed of the machine head is decreased and velocity adjustments are made.

It is a particular feature of the present invention that the sampling rate is constant over time. Thus, when the motion of the machining head is reduced, a correspondingly greater sampling density is provided, as necessary for accurate measurement in non-linear measurement environments.

Figure 10A:
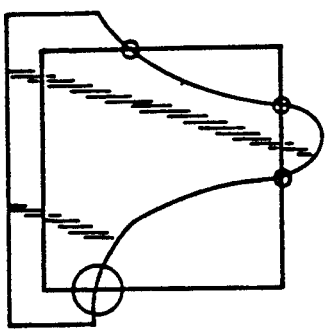
FIGS. 10A, 10B and 10C illustrate the operation of the apparatus of the present invention for three special cases.
Figure 10B:
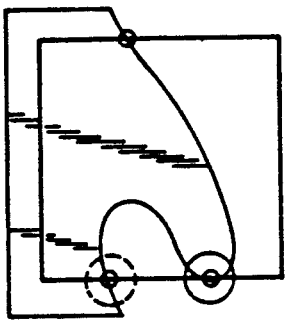
Figure 10C:
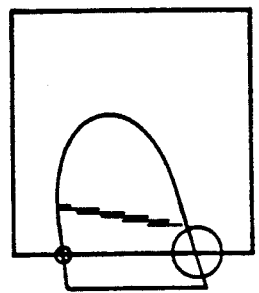

FIGS. 10A-10C illustrate three exemplary special cases. FIG. 10A illustrates a "narrow end", characterized by three black arrays, i.e. arrays which do not receive light reflected from the workpiece. FIG. 10B illustrates a "bay", characterized by an abrupt position shift of the black/white crossing on a given linear array. FIG. 10C illustrates a "finger", characterized by three non-uniform linear arrays. Each of these special cases is dealt with by a suitable algorithm sub-routine.

In order to achieve a relatively high signal-to-noise ratio, the apparatus of the present invention employs an illumination technique which produces shading of the object being measured. Accordingly, oblique illumination is provided, which is directed from the interior of the object being measured to the contour thereof.

Preferably a total of four illumination sources 70, such as LEDs imbedded in glass or plastic light guides, such as a light guide formed of Perspex (R), with appropriate reflectors are employed and are each centered outside a corresponding one of the linear arrays making up arrays 50. Only a single one of the sources 70 is illuminated at any given time. As seen in FIGS. 11A-11C, the source which is most nearly centered over the object is selected for illumination. The illumination provided by each source is sufficient to cover the entire instantaneous field of view. Preferably, the output wavelength of the source is matched to that of the linear sensor arrays to enhance the signal-to-noise ratio that is achieved.

In accordance with a preferred embodiment of the invention, automatic focussing apparatus is provided and operative to adjust the z-axis position of the machine head in order to maintain the image of the contour in focus on the detector array 50. FIG. 12A illustrates a signal indicating an out-of-focus arrangement in both raw and thresholded forms, while FIG. 12B illustrates the raw and thresholded forms of a signal from a focussed arrangement. Both signals are derived from a black/white crossing as illustrated in FIG. 12C.

Figure 13:
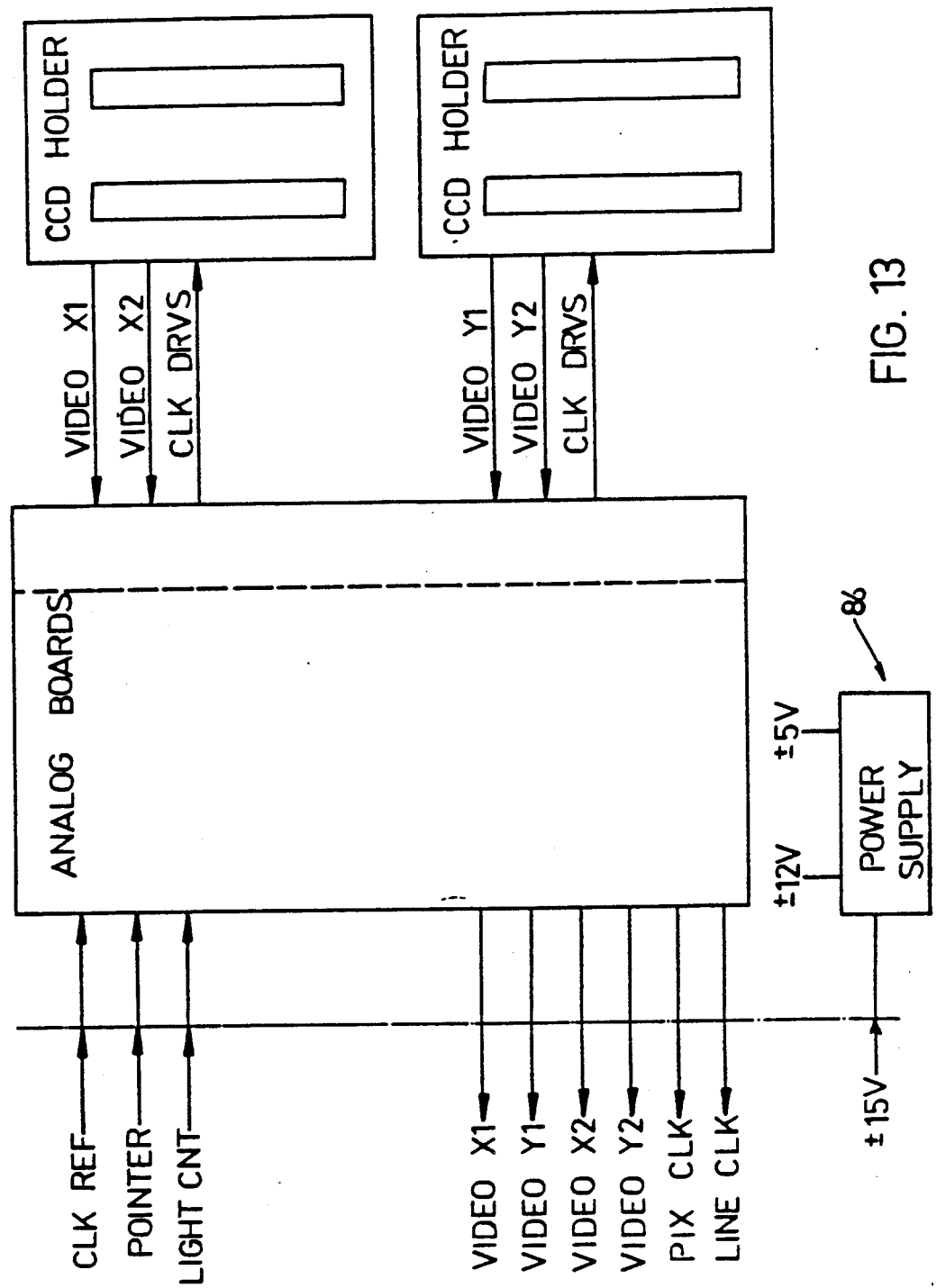
FIG. 13 is an electrical block diagram of a first part of the electronic circuitry in the sensor head of the present invention.
Figure 14:
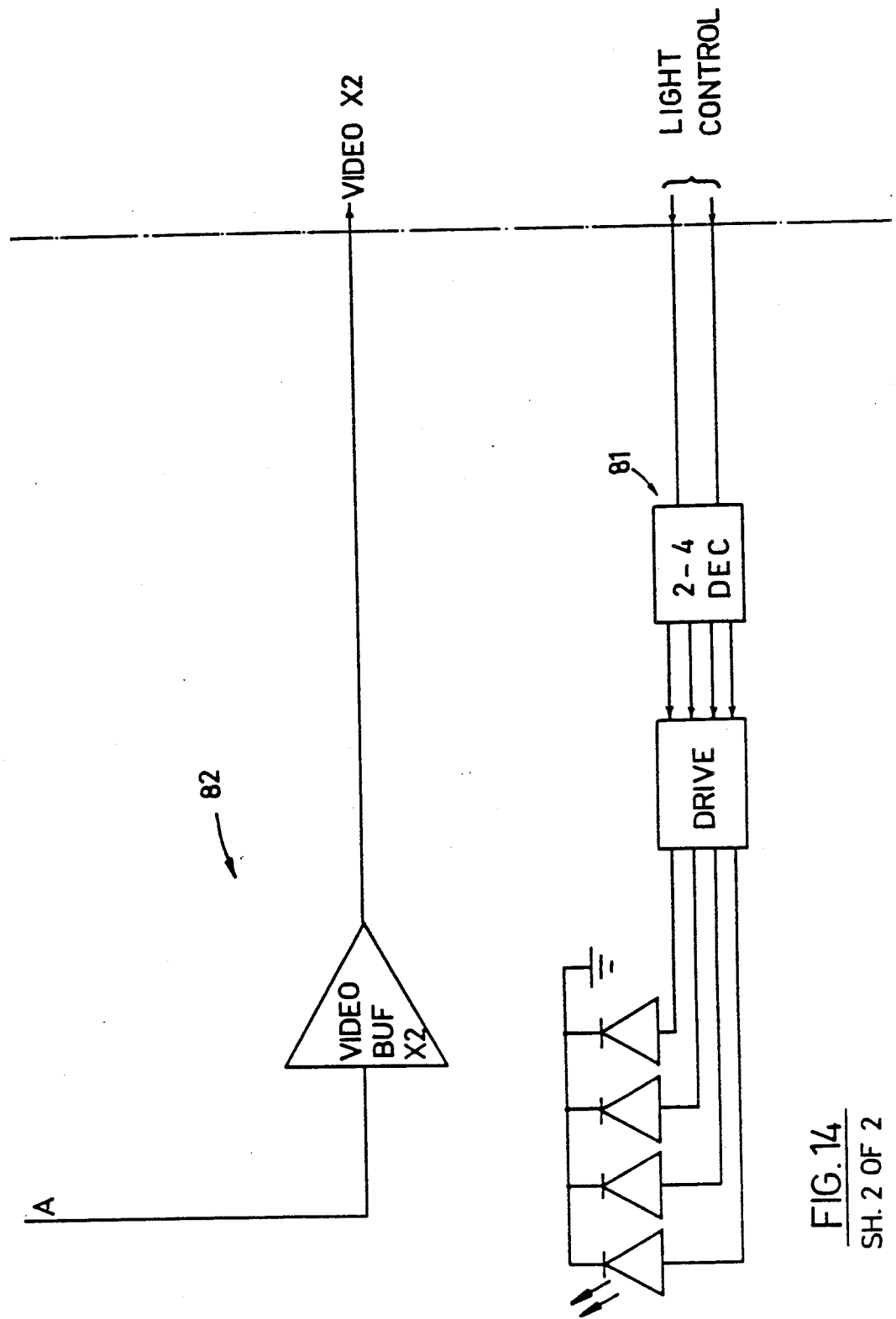
FIG. 14 with parts 1 and 2 is an electrical block diagram of a second part of the electronic circuitry in the sensor head of the present invention.

The electronic circuitry associated with the sensor head 10 (FIG. 1) is illustrated in FIGS. 13 and 14 and is seen to comprise clock means 80 for driving the CCD sensor arrays, video pre-processing circuitry 82, illumination control circuitry 84 and a power supply 86.

Figure 15:
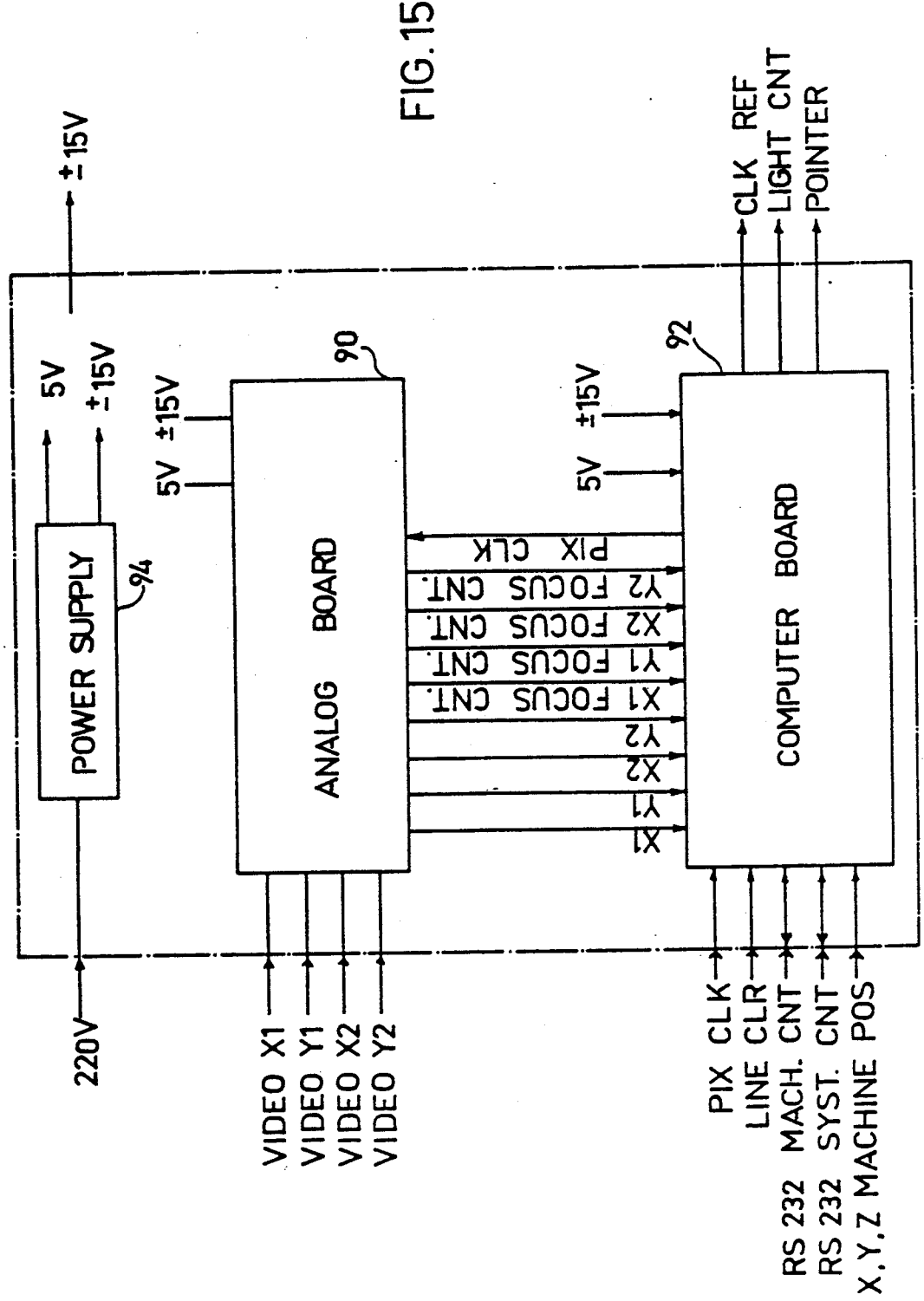
FIG. 15 is an electrical block diagram of the electronic unit forming part of the apparatus of the present invention.
Figure 16:
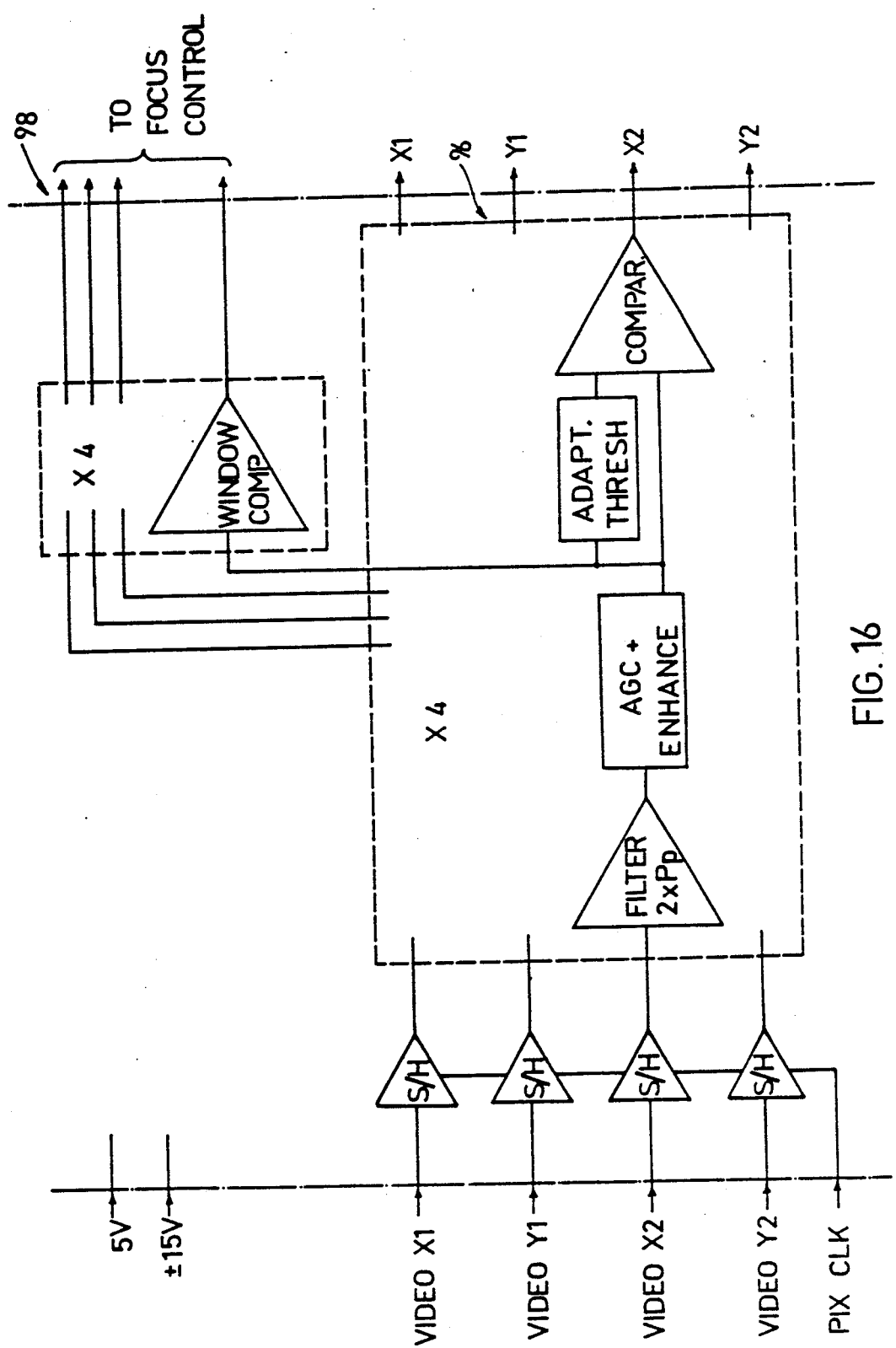
FIG. 16 is an electrical block diagram of the analog board forming part of the electronic unit of FIG. 15.
Figure 17:
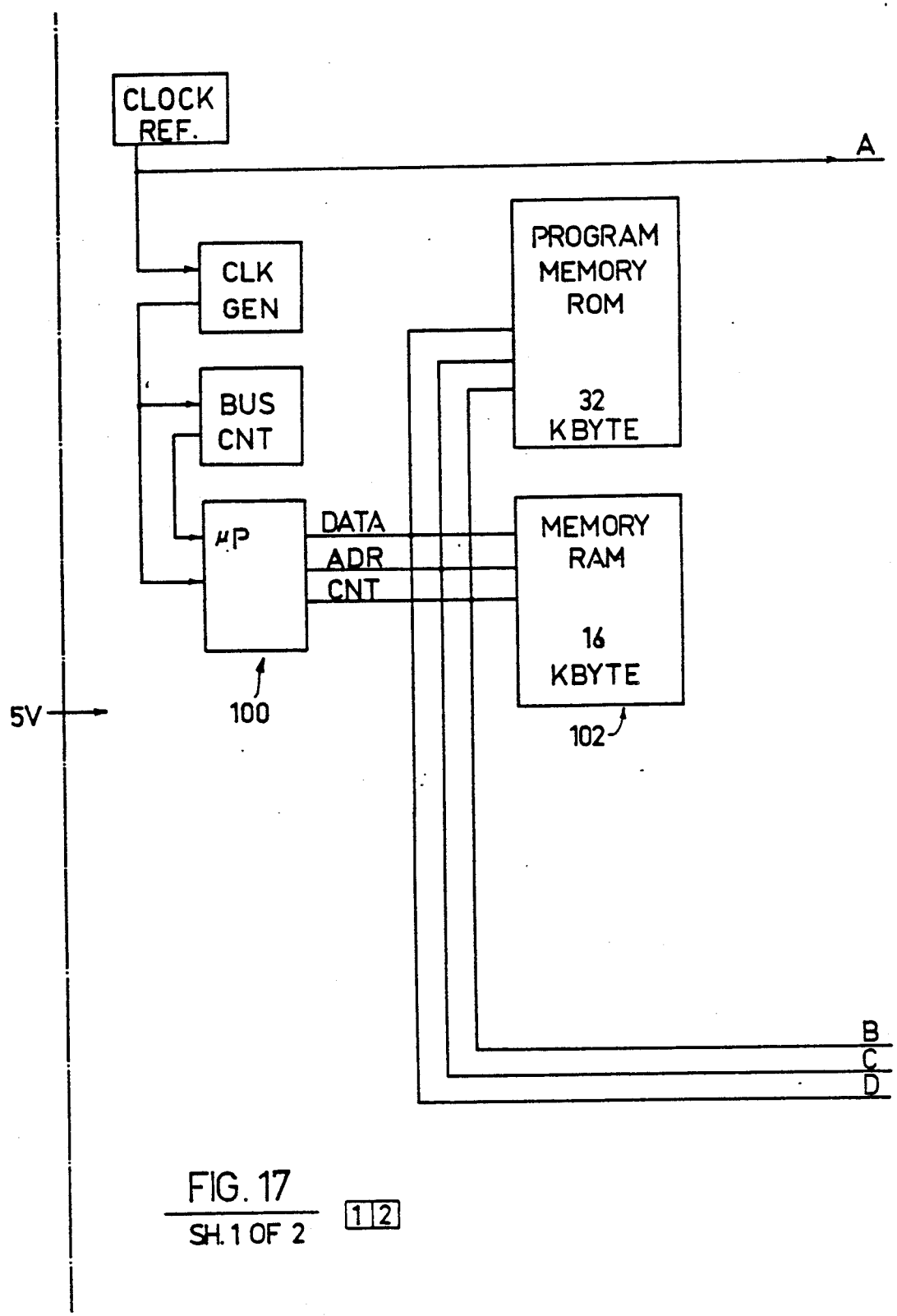
FIG. 17 with parts 1 and 2 is an electrical block diagram of the computer board forming part of the electronic unit of FIG. 15.
Figure 17:
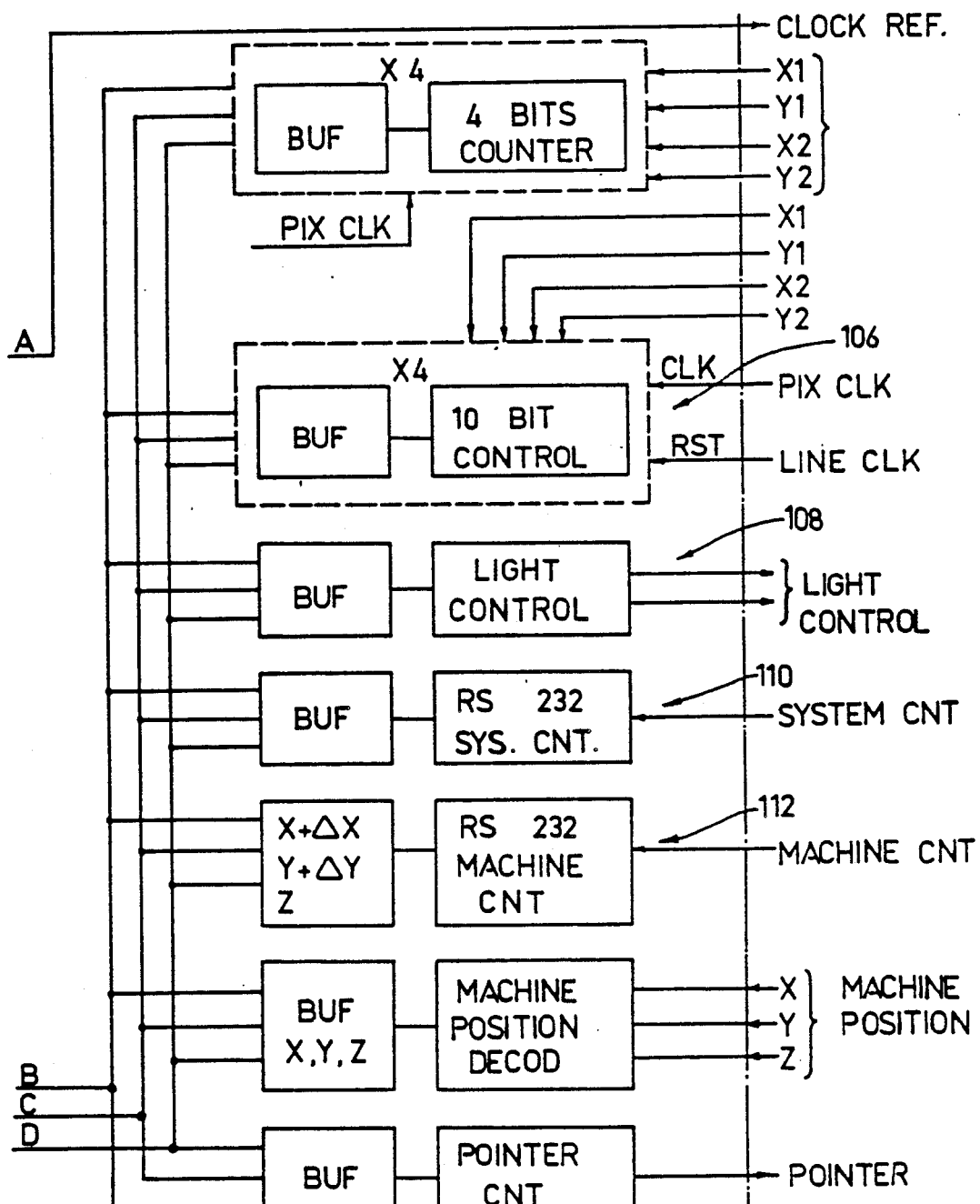

The electronic circuitry included in the electronic unit 12 (FIG. 1) is illustrated generally in FIG. 15 and includes an analog board 90, a computer board 92 and a power supply 94. The analog board is illustrated in FIG. 16 and includes circuitry 96 for video processing and circuitry 98 for automatic focus control. The computer board is illustrated in FIG. 17 and typically includes a 16 bit micro-processor and driving circuitry therefor 100, programs and data memories 102 focus control circuitry 104, digital video circuitry 106, illumination control circuitry 108, RS 232 communication ports 110 and 112 for interface with an external computer monitor and with the CNC controller and a main clock reference 114 for system timing.

Figure 18:
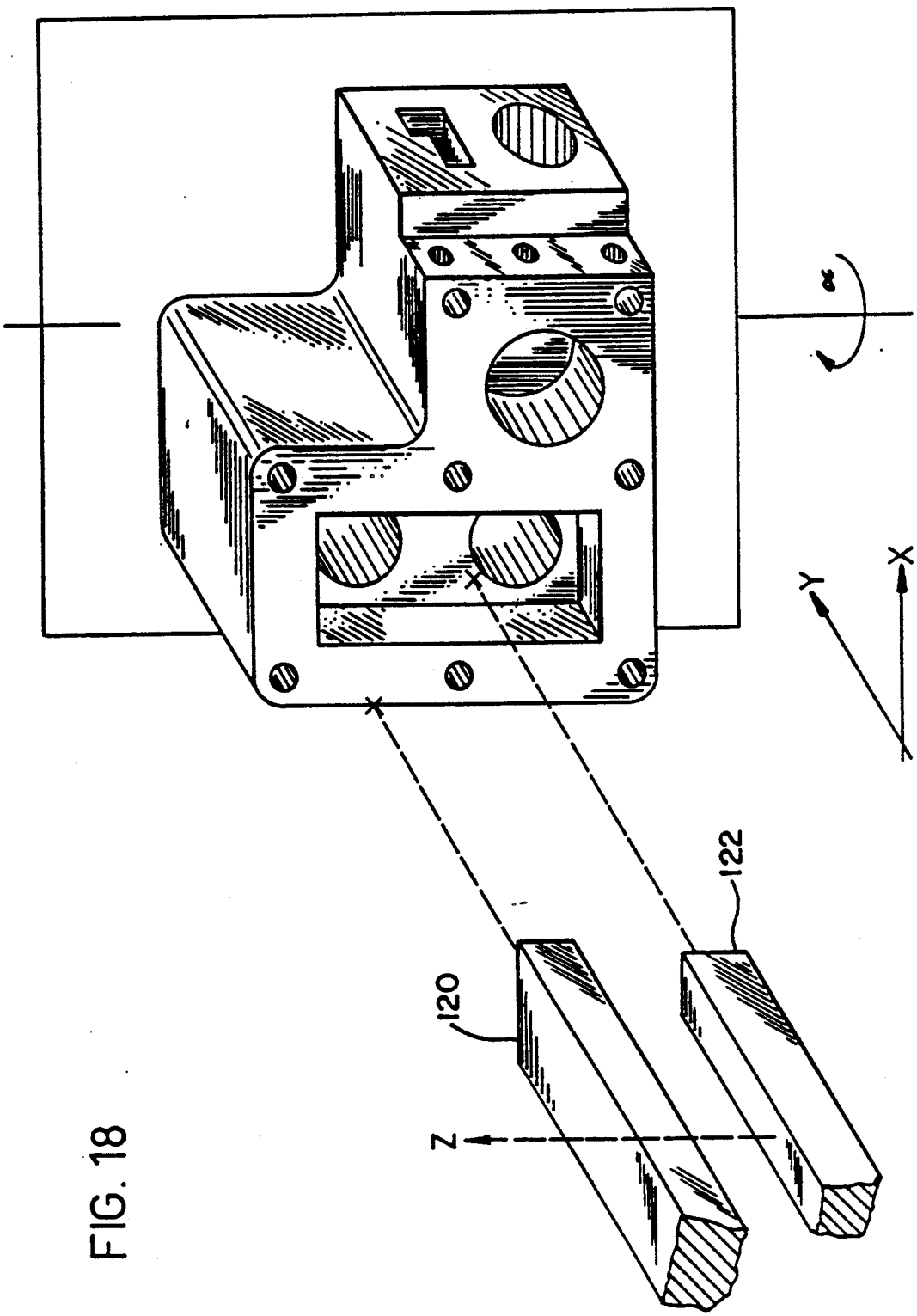
FIG. 18 is a generalized pictorial illustration of an optical head arranged for three-dimensional measurements of a workpiece.

Reference is now made to FIG. 18, which illustrates a modified optical head which is designed particularly for carrying out three-dimensional measurements. The apparatus of FIG. 18 includes typically all of the elements of the optical head described above in connection with FIGS. 1–3, together identified as an edge detector 120 as well as a range indicator 122, such as a range indicator manufactured by EL OR Optronics Ltd. of Afeka, Israel.

The apparatus of FIG. 18 has a significant advantage over prior art three-dimensional coutour detectors in that it does not employ a physical probe and thus does not require complicated in and out movements involved in permitting the probe to clear portions of the workpiece as the probe moves from location to location.

The operation algorithms for the apparatus of the present invention will now be described with reference to FIGS. 19–24.

Reference is now made to FIG. 19 which is a flow chart indicating the overall operation of the apparatus of the present invention, includes the microprocessor 100 of the electronic unit 12, here termed VMS-computer.

Upon commencement of operation, status data from the CNC position encoder 16 and frame data from the sensor head 10 are both read and the respective data is received and the ANALYSIS subroutine is commenced.

Figure 20:
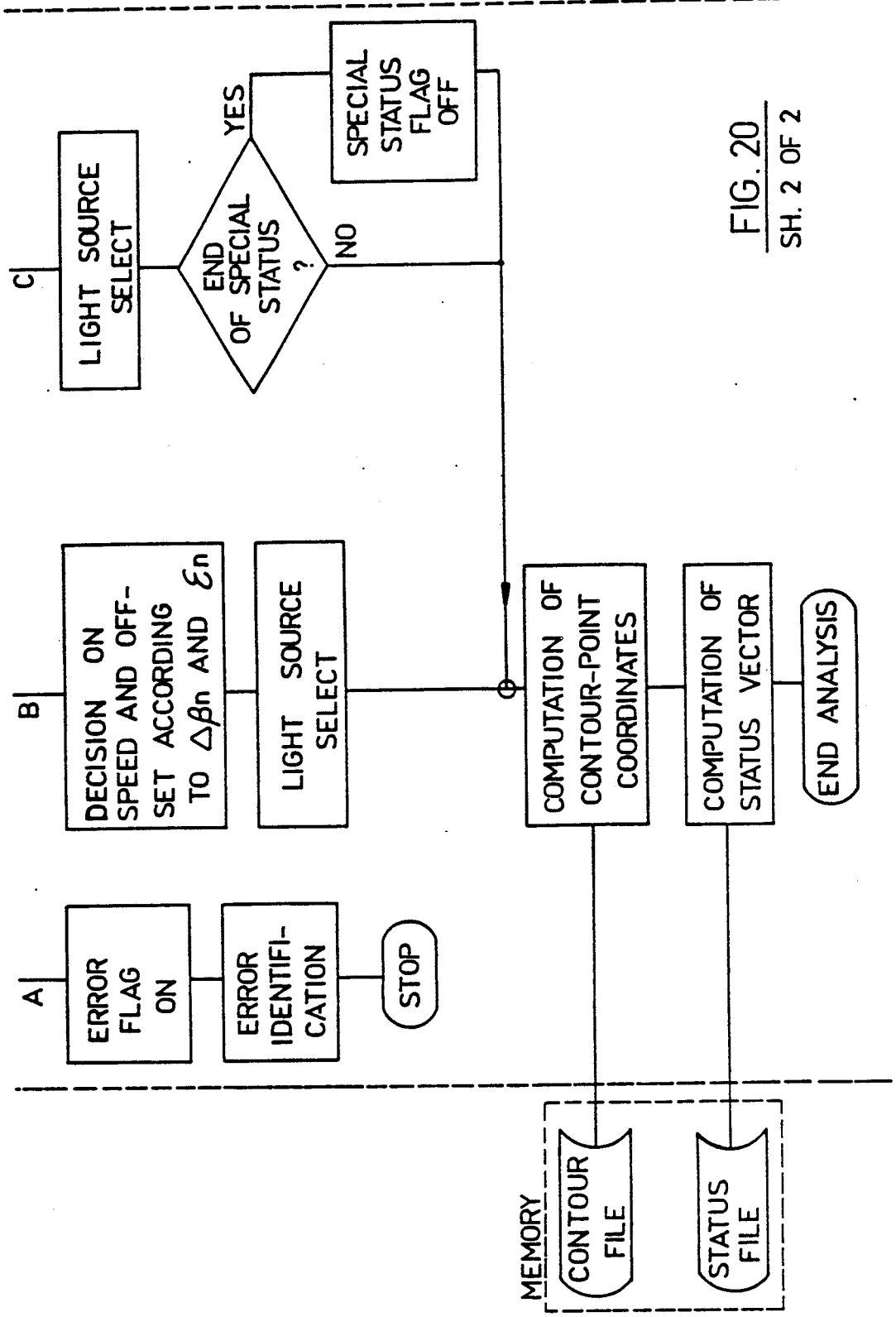

Referring now to FIG. 20, it is seen that the analysis program begins with a system status check. In the event that an error is found, suitable notification is provided and operation is terminated.

Figure 21:
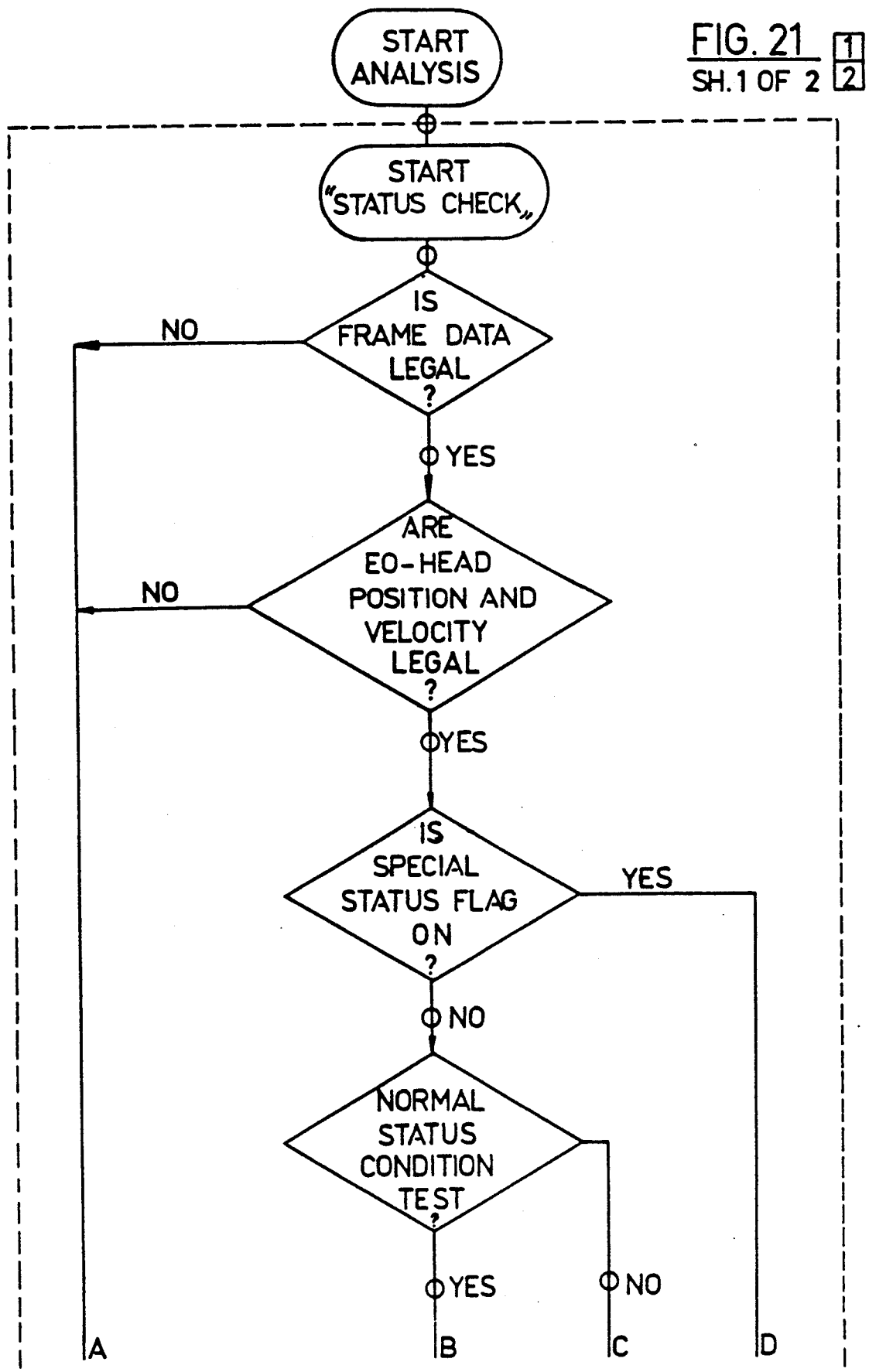
Figure 21:
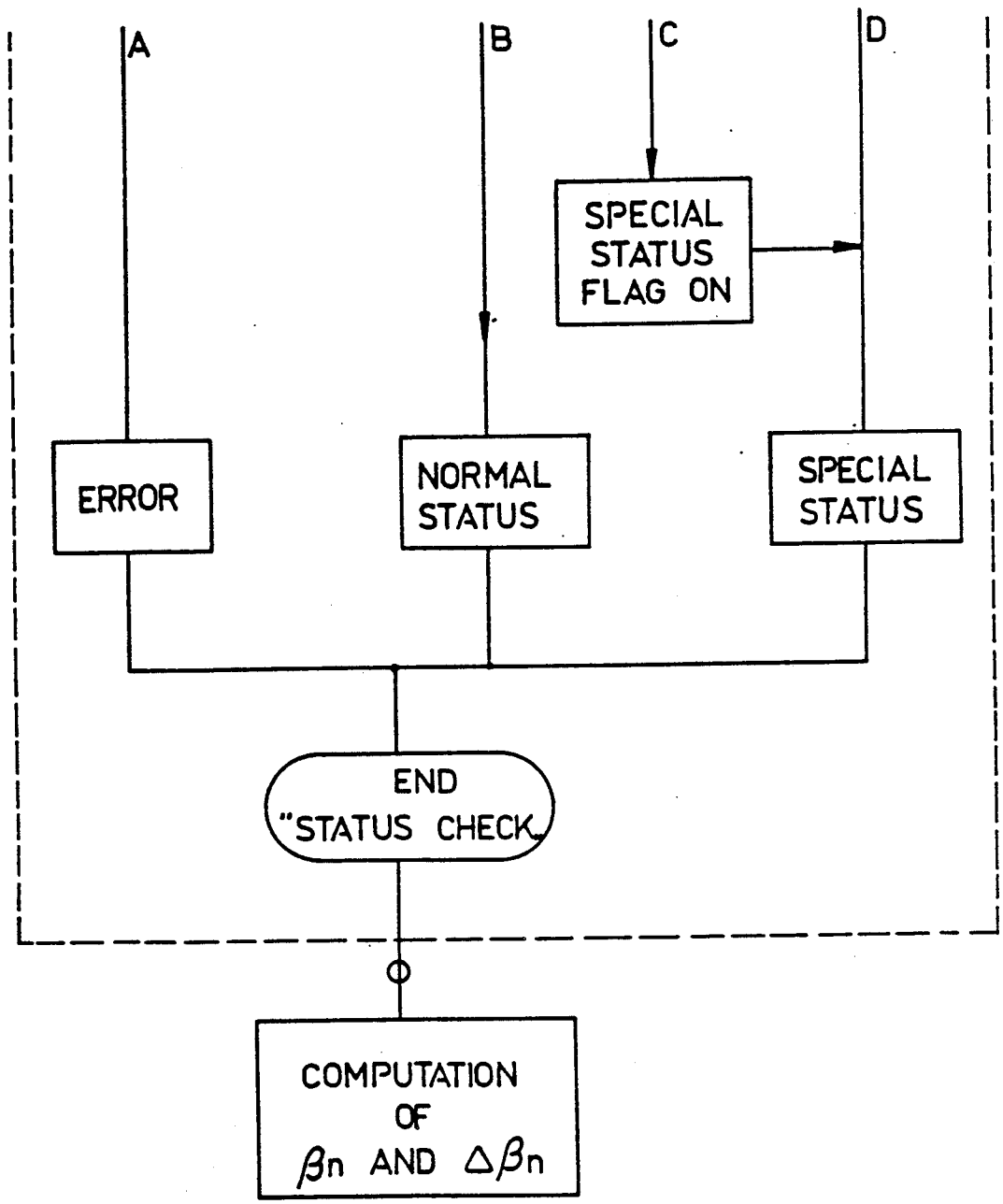

The system status check subroutine is illustrated in FIG. 21 includes checks as to the legality of the frame data and head position and velocity. Illegality of either produces an error default. Subsequently a check for the presence of a special status flag is carried out, followed by a check for normal status. A negative response to the normal status check produces a special status indication.

Figure 22:
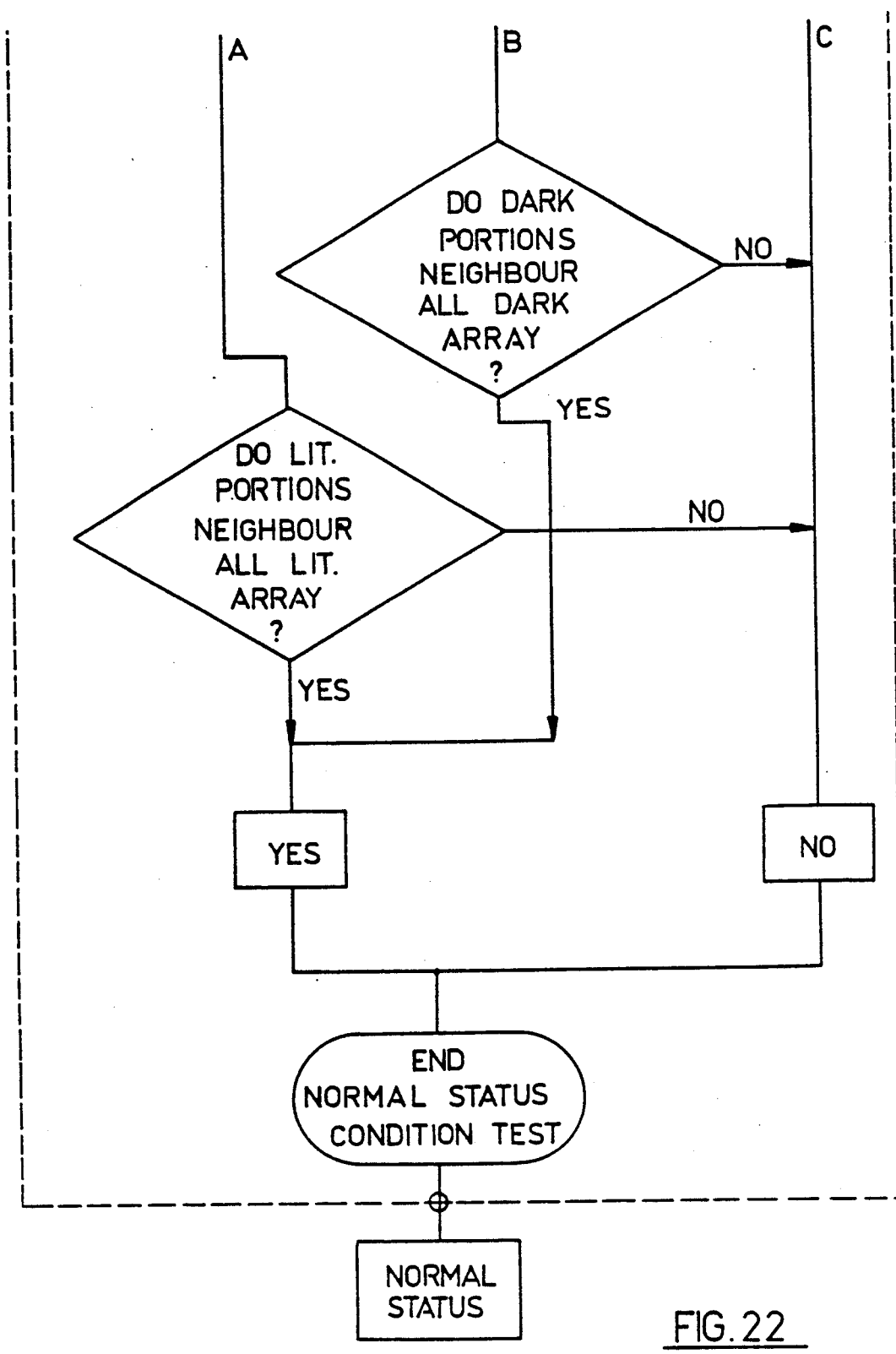

The normal status is illustrated in FIG. 22. It includes an initial check whether the number of transition arrays is equal to two. If not, special status is indicated.

Next it is determined whether the transition arrays are parallel. If no, the number of arrays which are all black, (i.e. entirely outside the object) is determined. If the number is 1, then special status is indicated. If the number is zero it is determined whether the all white portions are adjacent to each other. If no, special status is indicated. If yes then normal status is indicated.

If the transition arrays are parallel, it is determined whether all of the black portions are adjacent to each other. If no, special status is indicated, if yes, normal status is indicated.

Returning now to FIG. 20, it is seen that if normal status is found, the edge angle and deviation are computed based on the received frame and status data. The decenter is then computed and then these parameters are checked to see if they are legal. If they are not legal, then the above-described error notification is carried out and operation is terminated. If the parameters are found to be acceptable, a decision is made on machining head speed and offset in accordance with the edge angle, deviation and decenter information.

Figure 23:
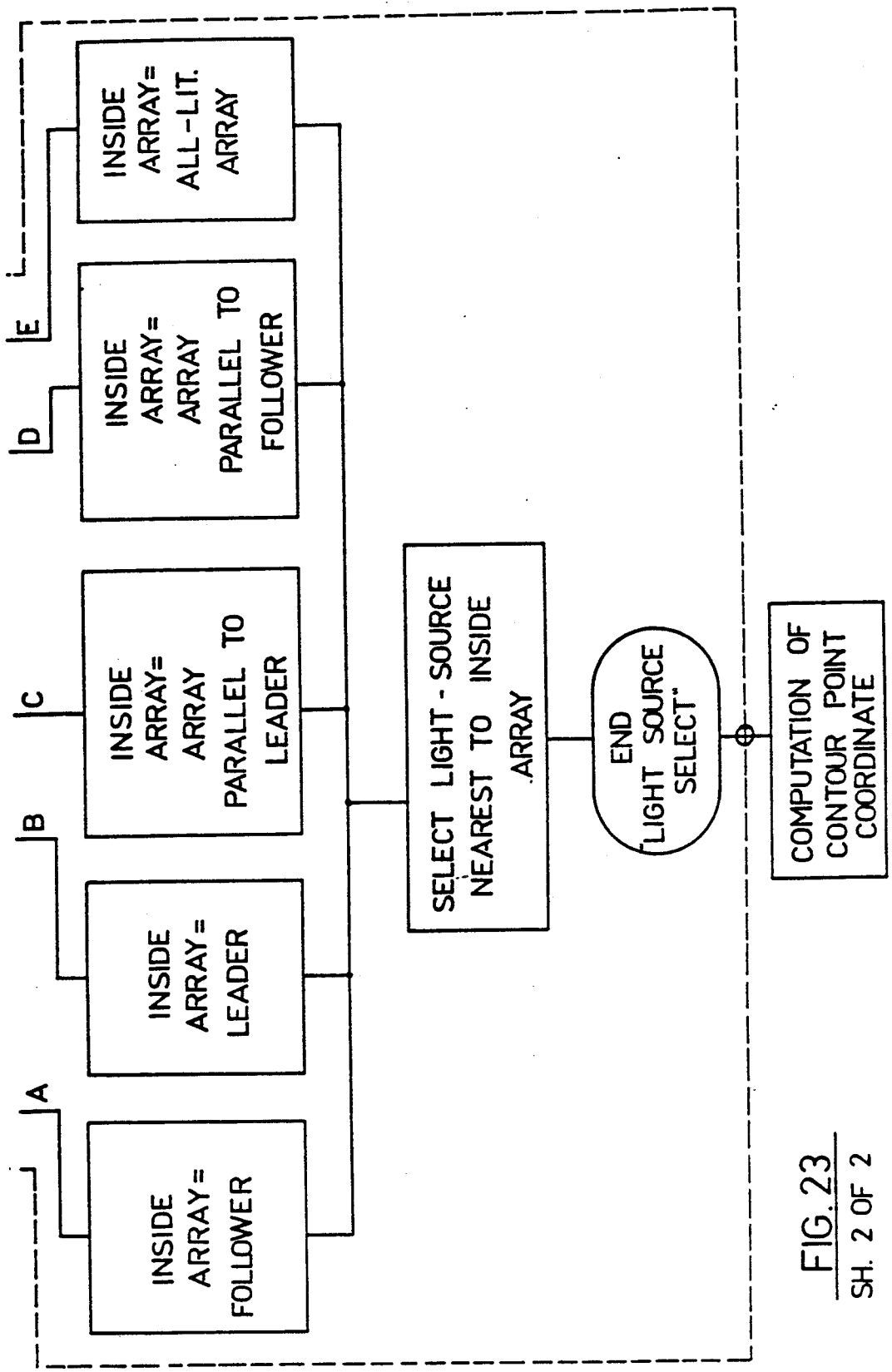

The algorithm for selecting an appropriate light source of illumination is illustrated in FIG. 23 and includes a determination of whether the transition arrays are parallel. If yes, then a case A situation is indicated, and the inside array is an all-white array, i.e. entirely inside the object. If no, a case B situation is indicated and a determination is made as to the number of all-black arrays. If the number is 0 a case B 2 situation is indicated. If the number is 2, a case B 1 situation is indicated.

Figures 24, 24A, 24B, 24C:
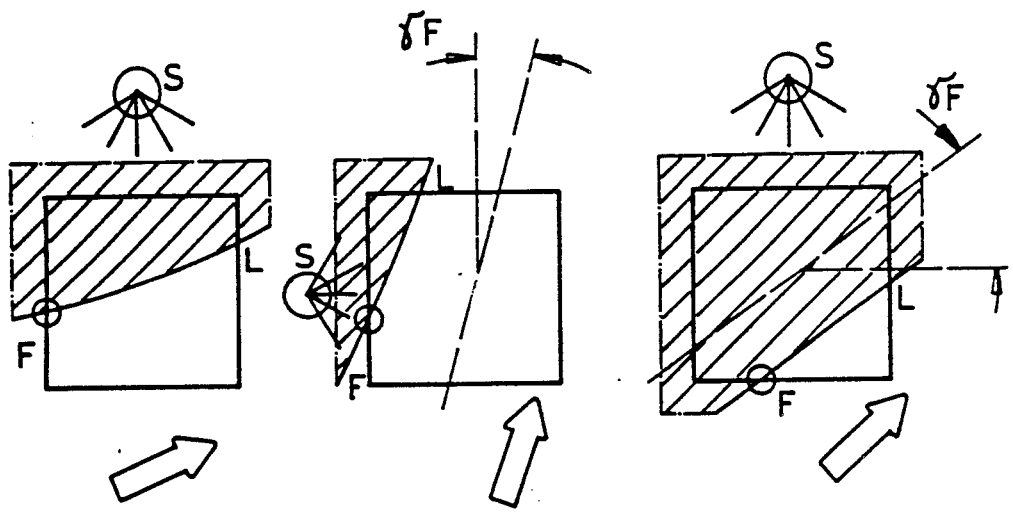
FIGS. 24A, 24B and 24C are illustrations of three types of illumination selection configurations.

The case A, case B 1 and case B 2 situations are illustrated in FIGS. 24A–24C. In each of these illustrations, the leading array is indicated by L, the following array is indicated by F and the actuated light source is indicated by S.

For both the B 1 and B 2 cases, a determination is made whether the angle gamma (F) between the contour and the following array is less than 1/square root of 2. For the B 1 case, if gamma(F) is less than 1/square root of 2, the inside array is the follower. For the B 2 case, if gamma(F) is less than 1/square root of 2, the inside array is the array parallel to the leader. For the B 1 case, if gamma (F) is more tha 1/square root of 2, the inside array is the leader. For the B 2 case, if gamma (F) is less than 1/square root of 2, the inside array is the array parallel to the follower.

Next the light source S most closely centered behind the inside array is illuminated. Thereafter the contour point coordinate is computed and stored in a contour file. Subsequently a status vector is computed and stored in a status file.

If a special status is found, the specific case that has been encountered is identified. If it is not a legal case, the error procedure is followed, if it is legal, a decision on head speed and offset is made in accordance with a special subroutine specific for the given special case. The light source is then selected and the contour point and status vector are then selected as in the normal status case.

Figure 25A:
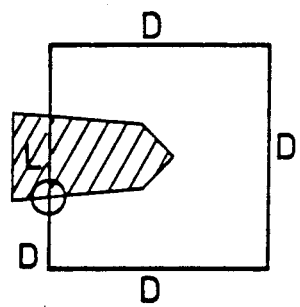
FIGS. 25A and 25B illustrate two special status categories of the A type.
Figure 25B:
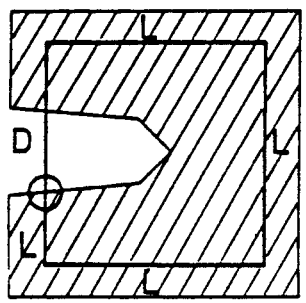
Figure 26A:
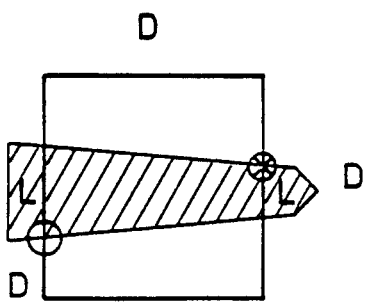
FIGS. 26A and 26B illustrate two special status categories of the B type.
Figure 26B:
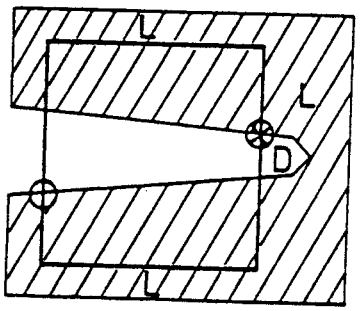
Figure 27A:
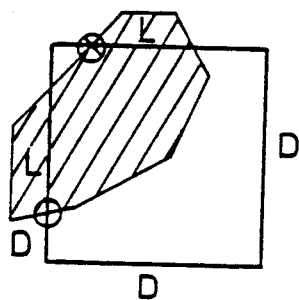
FIGS. 27A and 27B illustrate two special status categories of the C type.
Figure 27B:
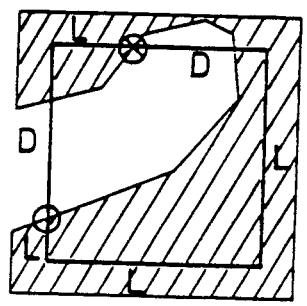
Figure 28A:
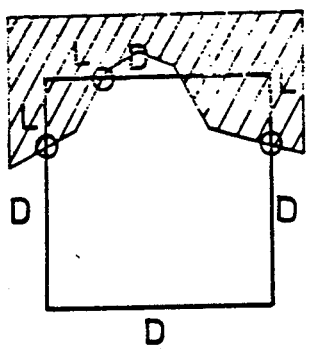
FIGS. 28A and 28B illustrate two special status categories of the D type.
Figure 28B:
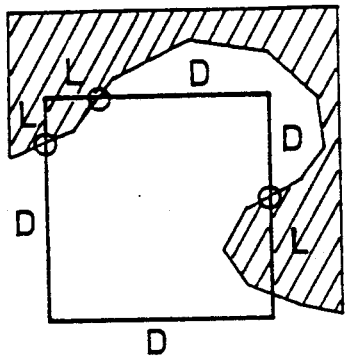
Figure 29:
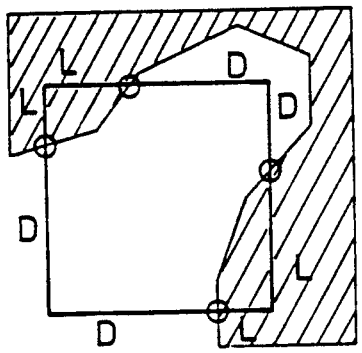
FIG. 29 illustrates a special status category of the E type.

Special status investigation attempts to classify special status situation into one of a plurality of special status categories. FIGS. 25A and 25B illustrate two special status categories of the A type. FIGS. 26A and 26B illustrate two special status categories of the B type. FIGS. 27A and 27B illustrate two special status categories of the C type. FIGS. 28A and 28B illustrate two special status categories of the D type. FIG. 29 illustrates a special status category of the E type.

The various types of special status categories are classified by the following parameters:
1. The number of all black arrays;
2. The number of all white arrays;
3. The number of all black arrays adjacent to a white portion of an array;
4. The number of all white arrays adjacent to a black portion of an array;
5. The number of white portions adjacent black portions.

Returning now to FIG. 19, it is noted that following the completion of the analysis program, the system provides velocity and offset commands to the CNC controller and light source select commands to the electronic in the sensor head 10.

Thereafter, it is determined when the sampling period time delay t 1 between measurements has expired. When this has occurred, the sensor operating clock is zeroed and the measurement cycle is begun anew for a new measurement.

Figure 30:
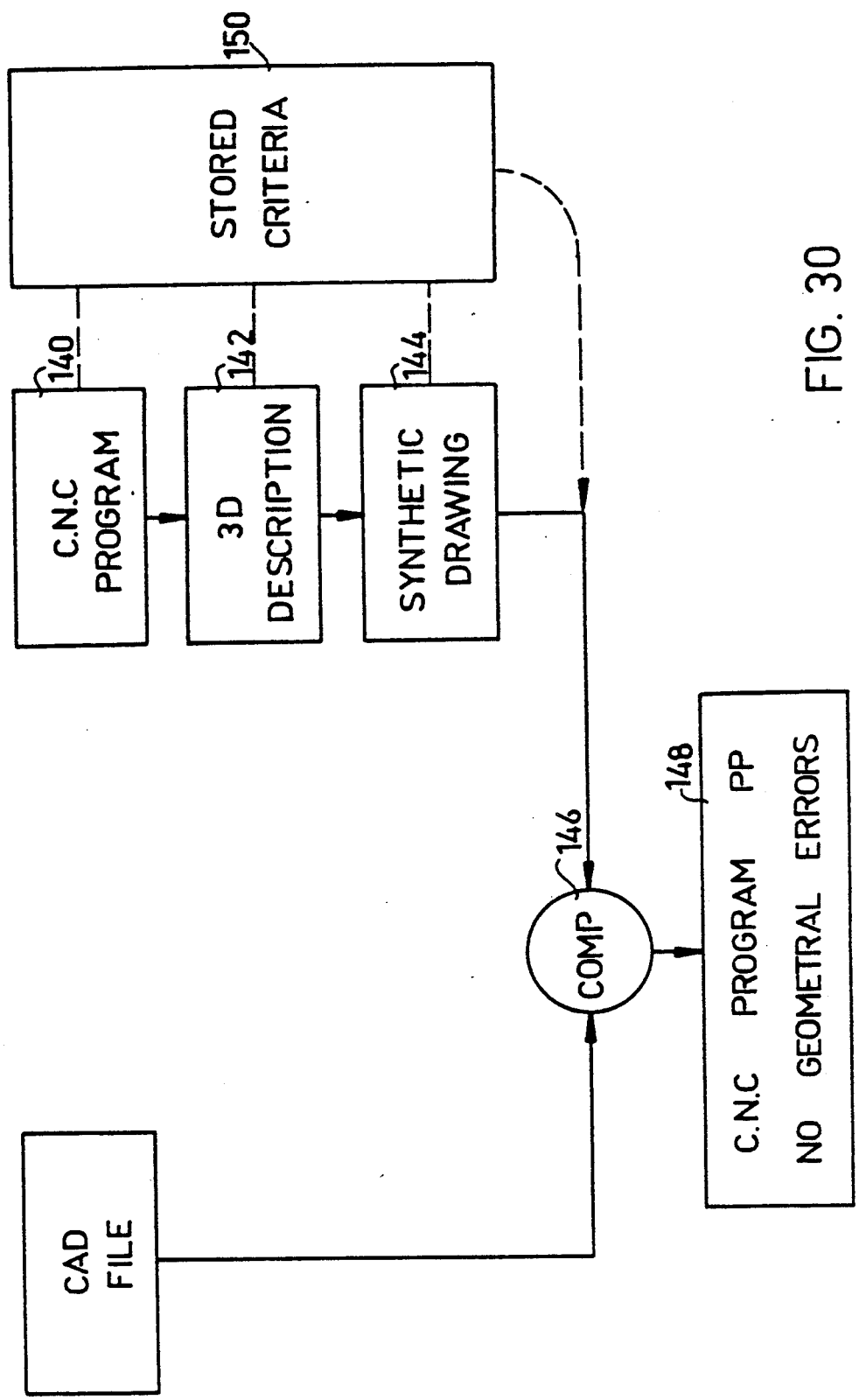
FIG. 30 illustrates apparatus for providing CNC programs.

Reference is now made to FIG. 30 whih illustrates apparatus for proving CNC programs without the necessity of trial machining and the high costs and time requirements associated therewith. According to the present invention, apparatus 140 is provided for causing a CNC program to be processed using conventional techniques to define a three-dimensional description of the machined object to be produced thereby. Apparatus 142 is also provided for causing this three-dimensional description to be further processed, also by conventional techniques, to produce a synthetic drawing 144 of the machined object.

According to a preferred embodiment of the present inveniton, the synthetic drawing is compared by comparison apparatus 146, also of conventional construction, with the CAD file for the same object. The comparison apparatus 146 is operative to provide an output indication 148 of any discrepancies between the CAD file, which is a geometrical description and the geometrical description embodied in the synthetic drawing 144 generated from the CNC program.

According to an optional feature, one or more of the CNC program, 3-dimensional description and synthetic drawing may be compared with stored parameters or configuration criteria 150, such as minimum or maximum machining thickness, for determination of comformity of the CNC program instructions with predetermined criteria and provision of an appropriate output indication of non-conformities.

It will be appreciated that the method described hereinabove is characterized by its relatively small computational load, since only one transition per array need be retained in the memory, and thus the method as described requires a relatively small computational power. However, the invention is not limited to the embodiment described herein and in particular, it is possible to retain a greater number of transitions per array in the memory, or retain some or all of the pixels, if desired.

It will be appreciated by persons skilled in the art that the present invention is not limited by what has been particularly shown and described hereinabove. Rather the scope of the present invention is defined only by the claims which follow:

I claim:

1. Apparatus for automatic tracking and contour measurement comprising;
   a CNC machining head; and
   electro-optical sensing means comprising a staring detector array mounted on said CNC machining head for directly providing without coordinate transformation an output indication of contours of an object and for providing signal for commanding said CNC machine head to move along the contours all in the precise frame of reference of said CNC machining head.

2. Apparatus according to claim 1 and wherein said electro-optical sensing means comprises first and second pairs of spaced linear detector arrays, said first and second pairs extending mutually perpendicularly.

3. Apparatus according to claim 2 and wherein said electro-optical sensing means comprises a beam splitter, which provides a first portion of incoming light to said first pair of spaced linear detectors lying in a first plane and provides a second portion of incoming light to said second pair of spaced linear detectors lying in a second plane, perpendicular to said first plane.

4. Apparatus according to claim 3 and wherein said first and second pairs of linear detectors and the beam splitter define an equivalent detector array in the form of a planar array defining a periphery of a rectangle.

5. Apparatus according to claim 3 and wherein said first and second pairs of linear detectors and the beam splitter define and equivalent detector array in the form of a planar array defining a periphery of a circle.

6. Apparatus according to claim 5 and also comprising means for sensing a direction of movement of said sensing means with respect to the object being measured, means for designating the leading array with respect to the direction of motion for providing direction information and means for designating an array following said equivalent detector array with respect to said direction of motion for providing measurement information.

7. Apparatus according to claim 1 and also comprising means for varying the velocity of said CNC machining head and means for maintaining a constant sampling rate over time, while varying said velocity of said CNC machining head, whereby at non-linear regions of an object contour a relatively greater number of measurement samples are provided as compared with linear regions.

8. Apparatus according to claim 2 and also comprising means for selectably illuminating the object as a function of its orientation relative to said arrays.

9. Apparatus according to claim 2 and also comprising automatic focusing means for maintaining the image of the contour of an object in focus on said detector arrays.

10. Apparatus according to claim 1 and also comprising non-contact range determination means for providing measurement information in three dimensions.

11. Apparatus for proving a CNC program prior to machining comprising:
   means for generating a three-dimensional description of a machined workpiece on the basis of a CNC program therefor;

means for generating a synthetic drawing of the machined workpiece from the three-dimensional description; and means for comparing the synthetic drawing with a corresponding CAD file for the machined workpiece to provide an output indication of discrepancies therebetween.

12. Apparatus according to claim 11 and also comprising means for comparing at least one of the CNC program, the three-dimensional description or the synthetic drawing with stored acceptable machining parameters and providing an output indication of discrepancies between elements of the CNC program and the acceptable machining parameters.

13. A method for providing a CNC program prior to machining comprising the steps of:

generating a three-dimensional description of a machined workpiece on the basis of a CNC program therefor;

generating a synthetic drawing of the machined workpiece from the three-dimensional description; and comparing the synthetic drawing with a corresponding CAD file for the machined workpiece to provide an output indication of discrepancies therebetween.

14. A method according to claim 13 and also comprising the step of comparing at least one of the CNC program, the three-dimensional description or the synthetic drawing with stored acceptable machining parameters and providing an output indication of discrepancies between elements of the CNC program and the acceptable machining parameters.

* * * * *